US011359698B2

(12) United States Patent
Eo et al.

(10) Patent No.: US 11,359,698 B2
(45) Date of Patent: Jun. 14, 2022

(54) DUAL CLUTCH TRANSMISSION

(71) Applicants: Hyundai Motor Company, Seoul (KR); Kia Motors Corporation, Seoul (KR)

(72) Inventors: Soon Ki Eo, Ansan-si (KR); Dong Woo Kim, Incheon (KR); Min Ho Chae, Incheon (KR); Chon Ok Kim, Yongin-si (KR); Seong Wook Hwang, Gunpo-si (KR); Marcus Meyer, Chemnitz (DE); Mirko Leesch, Gelenau (DE); Erik Schreiterer, Chemnitz (DE); Rico Resch, Chemnitz (DE); Matthias Hoehne, Dresdan (DE); Joerg Mueller, Chemnitz (DE)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 71 days.

(21) Appl. No.: 16/920,180

(22) Filed: Jul. 2, 2020

(65) Prior Publication Data

US 2021/0246969 A1 Aug. 12, 2021

(30) Foreign Application Priority Data

Feb. 10, 2020 (KR) ........................ 10-2020-0015890

(51) Int. Cl.
*F16H 3/00* (2006.01)
*F16H 3/093* (2006.01)
(Continued)

(52) U.S. Cl.
CPC ................. *F16H 1/32* (2013.01); *F16H 1/46* (2013.01); *F16H 3/006* (2013.01); *F16H 3/093* (2013.01);
(Continued)

(58) Field of Classification Search
CPC ................................ F16H 3/006; F16H 3/093
(Continued)

(56) References Cited

U.S. PATENT DOCUMENTS 4,539,866 A * 9/1985 Koivunen ............. F16H 37/021
475/204
7,544,141 B2 * 6/2009 Holmes ................... B60K 6/40
475/5
(Continued)

FOREIGN PATENT DOCUMENTS

KR 2019-0065668 A 6/2019

*Primary Examiner* — Ha Dinh Ho
(74) *Attorney, Agent, or Firm* — Morgan, Lewis & Bockius LLP

(57) ABSTRACT

Provided is a dual clutch transmission. First and second input shafts are mounted concentrically. First and second output shafts are mounted in parallel to the first input shaft and respectively include output gears engaged with a ring gear of a differential. The rotations of first and second gears are restrained by the first input shaft. The rotations of third and fourth gears are restrained by the second input shaft. The rotations of fifth and sixth gears engaged with the second and third gears, respectively, are restrained by the first output shaft. The rotation of a seventh gear engaged with the first gear is restrained by the second output shaft. An eighth gear is engaged with the second gear to be rotatable about the second output shaft. The rotation of a ninth gear engaged with the fourth gear and restrained by the eighth gear is restrained by the second output shaft.

18 Claims, 21 Drawing Sheets

(51) Int. Cl.
*F16H 1/32* (2006.01)
*F16H 57/023* (2012.01)
*F16H 57/00* (2012.01)
*F16H 1/46* (2006.01)
*F16H 1/28* (2006.01)

(52) U.S. Cl.
CPC ....... *F16H 57/0031* (2013.01); *F16H 57/023* (2013.01); *F16H 2001/2872* (2013.01); *F16H 2001/327* (2013.01); *F16H 2200/0052* (2013.01); *F16H 2200/201* (2013.01); *F16H 2200/2035* (2013.01)

(58) Field of Classification Search
USPC .................................................... 74/330, 331
See application file for complete search history.

(56) References Cited

U.S. PATENT DOCUMENTS

| | | | | |
|---|---|---|---|---|
| 7,980,980 B2* | 7/2011 | Rask | ........................ | B60L 15/20 |
| | | | | 475/5 |
| 9,586,468 B2* | 3/2017 | Kubo | ...................... | B60K 6/365 |
| 2008/0103002 A1* | 5/2008 | Holmes | .................. | F16H 3/728 |
| | | | | 475/5 |
| 2013/0213043 A1* | 8/2013 | Kasuya | .................. | F02B 63/04 |
| | | | | 60/700 |
| 2013/0291374 A1* | 11/2013 | Ohnemus | ................ | B60K 6/48 |
| | | | | 29/598 |

* cited by examiner

FIG. 9

| Category | Clutch | | Synchronizer | | | | | | |
|---|---|---|---|---|---|---|---|---|---|
| | CL1 | CL2 | S1 | S2 | S3 | S4 | S5 | S6 | S7 |
| First Gear | ● | | | ● | | ● | | ● | |
| Second Gear | | ● | | | | ● | | | |
| Third Gear | ● | | | ● | ● | | | | |
| Fourth Gear | | ● | | | | ● | | ● | |
| Fifth Gear | ● | | ● | | | | | | |
| Sixth Gear | | ● | | | | | ● | | |
| R Gear | ● | | | ● | | | | ● | ● |

FIG. 10

| Category | First Gear | Third Gear | Fifth Gear |
|---|---|---|---|
| Second Gear | ● | ● | ● |
| Fourth Gear | | ● | ● |
| Sixth Gear | | ● | ● |
| R Gear | | | |

DUAL CLUTCH TRANSMISSION

CROSS REFERENCE TO RELATED APPLICATION

The present application claims priority to Korean Patent Application No. 10-2020-0015890, filed Feb. 10, 2020, the entire contents of which is incorporated herein for all purposes by this reference.

BACKGROUND OF THE INVENTION

Field of the Invention

The present invention relates to a dual clutch transmission (DCT) mounted on a vehicle.

Description of Related Art

A dual clutch transmission (DCT) advantageously has excellent power transmission efficiency and high transmission quality.

Generally, in a vehicle transmission, increases in the number of transmission gears provided in a vehicle may allow the operating points of an engine to be realized more idealistically, improving the fuel efficiency of the vehicle.

However, with increases in the number of transmission gears, the length of a transmission tends to increase, and thus, the ability of the transmission to be mounted on a vehicle may be further restricted. In particular, in a front engine front drive (FF) vehicle, a space to be occupied by a transmission is significantly restricted such that the transmission may not be mountable on the vehicle.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a dual clutch transmission (DCT) which may obtain excellent vehicle mountability by obtaining a relatively short length while realizing a plurality of transmission gears to improve fuel efficiency of a vehicle.

In various aspects of the present invention, various aspects according to various aspects of the present invention, there is provided a dual clutch transmission including: a first input shaft and a second input shaft mounted concentrically to the first input shaft; a first output shaft and a second output shaft each mounted in parallel to the first input shaft and respectively including first and second output gears engaged with a ring gear of a differential; a first gear and a second gear, rotations of which are to be restrained by the first input shaft; a third gear and a fourth gear, rotations of which are continuously restrained by the second input shaft; a fifth gear engaged with the second gear, with a rotation thereof being to be selectively restrained by the first output shaft; a sixth gear engaged with the third gear, with a rotation thereof being to be selectively restrained by the first output shaft; a seventh gear engaged with the first gear, with a rotation thereof being continuously restrained by the second output shaft; an eighth gear engaged with the second gear and rotatably mounted on the second output shaft; and a ninth gear engaged with the fourth gear and rotatably mounted on the second output shaft, the ninth gear being configured to be restrained by the eighth gear.

The second input shaft may include a hollow shaft surrounding the first input shaft, and the first gear, the second gear, the third gear and the fourth gear may be mounted sequentially in an axial direction thereof.

The dual clutch transmission may further include: a first synchronizer provided between the first gear and the second gear and being configured for restraining the rotation of the first gear to the first input shaft; and a second synchronizer provided between the first synchronizer and the second gear and being configured for restraining the rotation of the second gear to the first input shaft.

The first output shaft may be provided with a third synchronizer selectively restraining the rotation of the fifth gear to the first output shaft and a fourth synchronizer selectively restraining the rotation of the sixth gear to the first output shaft. The fifth gear and the sixth gear may be located between the third synchronizer and the fourth synchronizer.

The dual clutch transmission may further include a third output shaft mounted in parallel to the first input shaft and including a third output gear engaged with the ring gear of the differential. A tenth gear may be provided between the sixth gear and the fourth synchronizer, with a rotation of the tenth gear being continuously restrained by the sixth gear. An eleventh gear may be provided on the third output shaft to be engaged with the tenth gear, with a rotation of the eleventh gear being selectively restrained by the third output shaft.

The third output shaft may be provided with a seventh synchronizer selectively restraining the rotation of the eleventh gear to the third output shaft and a parking gear.

The second output shaft may be provided with a fifth synchronizer selectively restraining the ninth gear to the second output shaft. A sixth synchronizer configured for selectively connecting the eighth gear and the ninth gear may be provided between the eighth gear and the ninth gear.

The eighth gear may be rotatably mounted on the second output shaft. The sixth synchronizer may be provided along the axial direction between the eighth gear and the ninth gear.

A total of six gear columns may be provided, the gear columns being spaces occupied in the axial direction by gears engaged with each other in a direction perpendicular to the axial direction thereof. A total of three sleeve columns may be provided in addition to the spaces occupied by the gear columns in the axial direction thereof, the sleeve columns being spaces occupied by synchronizers in the axial direction thereof. All of transmission gear positions of six forward gear positions and a single reverse gear position may be realized.

The eighth gear may be rotatably mounted on an external region of a portion connecting the ninth gear and the fifth synchronizer. The sixth synchronizer may be provided in the axial direction of the second output shaft, between the eighth gear and the fifth synchronizer.

A total of six gear columns may be provided, the gear columns being spaces occupied in the axial direction by gears engaged with each other in a direction perpendicular to the axial direction thereof. A total of two sleeve columns may be provided in addition to the spaces occupied by the gear columns in the axial direction thereof, the sleeve columns being spaces occupied by the synchronizers in the axial direction thereof. All of transmission gear positions of six forward gear positions and a single reverse gear position may be realized.

The second input shaft may include a hollow shaft surrounding the first input shaft. The first, second, fourth, and third gears may be mounted sequentially in an axial direction thereof.

The dual clutch transmission may further include: a first synchronizer provided between the first gear and the second gear and being configured for restraining the rotation of the first gear to the first input shaft; and a second synchronizer provided between the first synchronizer and the second gear and being configured for restraining the rotation of the second gear to the first input shaft.

The first output shaft may be provided with a third synchronizer selectively restraining the rotation of the fifth gear to the first output shaft and a fourth synchronizer selectively restraining the rotation of the sixth gear to the first output shaft, the fifth gear is located between the third synchronizer and the fourth synchronizer, and the fourth synchronizer is located between the fifth gear and the sixth gear.

The second output shaft may be provided with a fifth synchronizer selectively restraining the ninth gear to the second output shaft. A sixth synchronizer configured for selectively connecting the eighth gear and the ninth gear may be provided between the eighth gear and the ninth gear.

The eighth gear may be rotatably mounted on an external region of a portion connecting the ninth gear and the fifth synchronizer. The sixth synchronizer may be provided in the axial direction of the second output shaft, between the eighth gear and the fifth synchronizer.

The present invention may obtain excellent vehicle mountability of a transmission by obtaining a relatively short length while realizing a plurality of transmission gears to improve fuel efficiency of a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objectives, features, and other advantages of the present invention

FIG. 9 is an operation table illustrating gear positions to be realized by the transmission illustrated in FIG. 1;

FIG. 10 is a transmission table of the transmission illustrated in FIG. 1;

Figure 1:
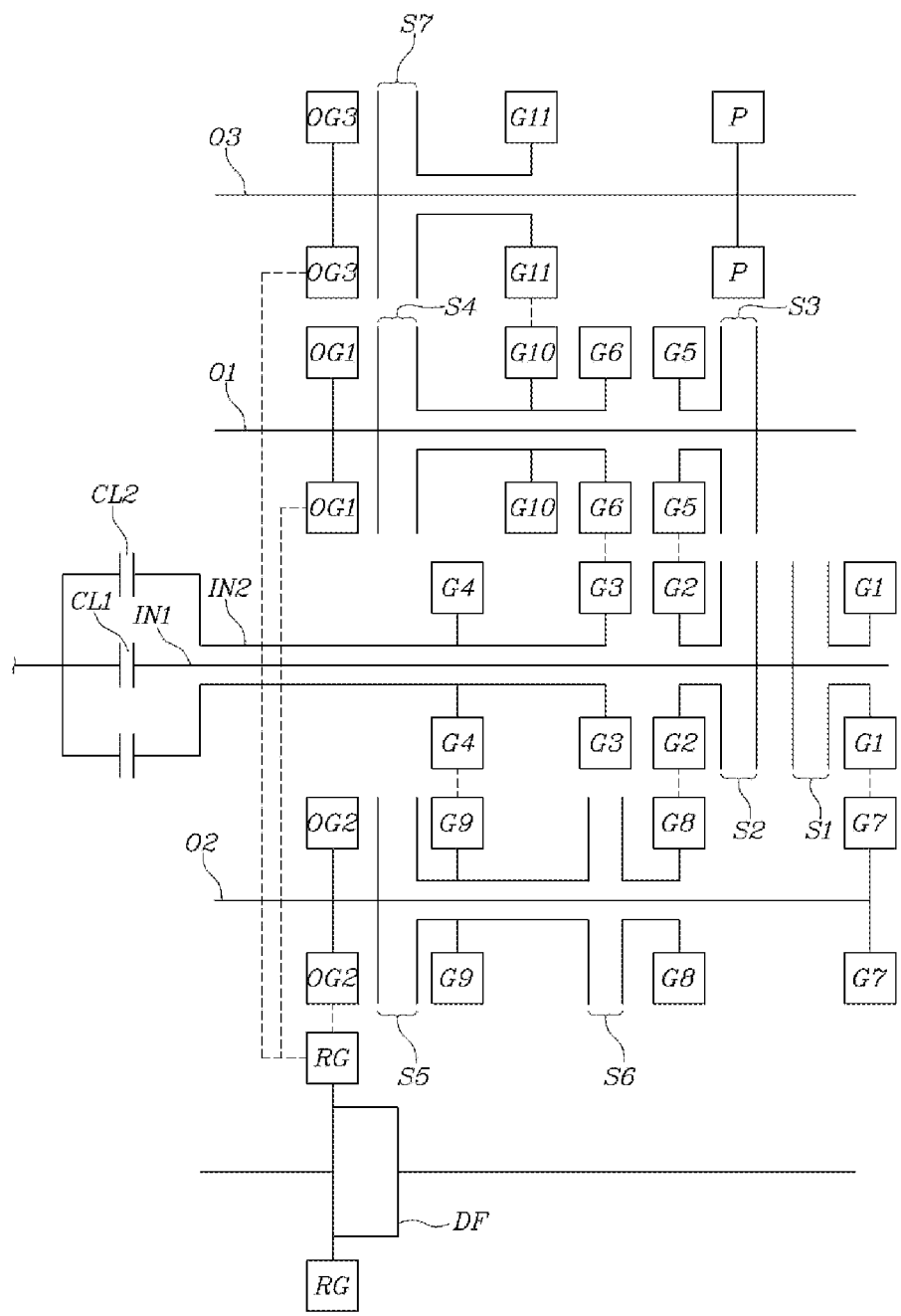
FIG. 1 is a diagram illustrating various exemplary embodiments of a dual clutch transmission according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Referring to FIGS. 1, 11, 12, and 20, all embodiments of the dual clutch transmission (DCT) according to an exemplary embodiment of the present invention commonly include: a first input shaft IN1 and a second input shaft IN2 mounted concentrically; a first output shaft O1 and a second output shaft O2 mounted in parallel to the first input shaft IN1 and respectively including first and second output gears engaged with a ring gear RG of a differential DF; a first gear G1 and a second gear G2, rotations of which are to be restrained by the first input shaft IN1; a third gear G3 and a fourth gear G4, rotations of which are restrained by the second input shaft IN2; a fifth gear G5 engaged with the second gear G2, with a rotation thereof being to be restrained by the first output shaft O1; a sixth gear G6 engaged with the third gear G3, with a rotation thereof being to be restrained by the first output shaft O1; a seventh gear G7 engaged with the first gear G1, with a rotation thereof being restrained by the second output shaft O2; an eighth gear G8 engaged with the second gear G2 to be rotatable about the second output shaft O2; and a ninth gear G9 engaged with the fourth gear G4, with a rotation thereof being to be restrained by the second output shaft O2, the ninth gear G9 being configured to be restrained by the eighth gear G8.

That is, each of the exemplary embodiments of the present invention includes the first input shaft IN1 and the second input shaft IN2 receiving power from a power source, such as an engine or a motor, the first output shaft O1 and the second output shaft O2 mounted in parallel to the first input shaft IN1 and the second input shaft IN2, and the first to ninth gears G1 to G9.

Here, the first input shaft IN1 is configured to receive the power through a first clutch CL1, and the second input shaft IN2 is configured to receive the power through a second clutch CL2.

The first output shaft O1 is engaged with the ring gear RG of the differential DF through a first output gear OG1, while the second output shaft O2 is engaged with the ring gear RG of the differential DF through a second output gear OG2.

For reference, the term "axial direction" as used herein refers to the longitudinal direction of each of the first input shaft IN1, the second input shaft IN2, the first output shaft O1, and the second output shaft O2. Since all of the first input shaft IN1, the second input shaft IN2, the first output shaft O1, and the second output shaft O2 are mounted in parallel, the longitudinal directions thereof mean the same direction thereof.

Figure 11:
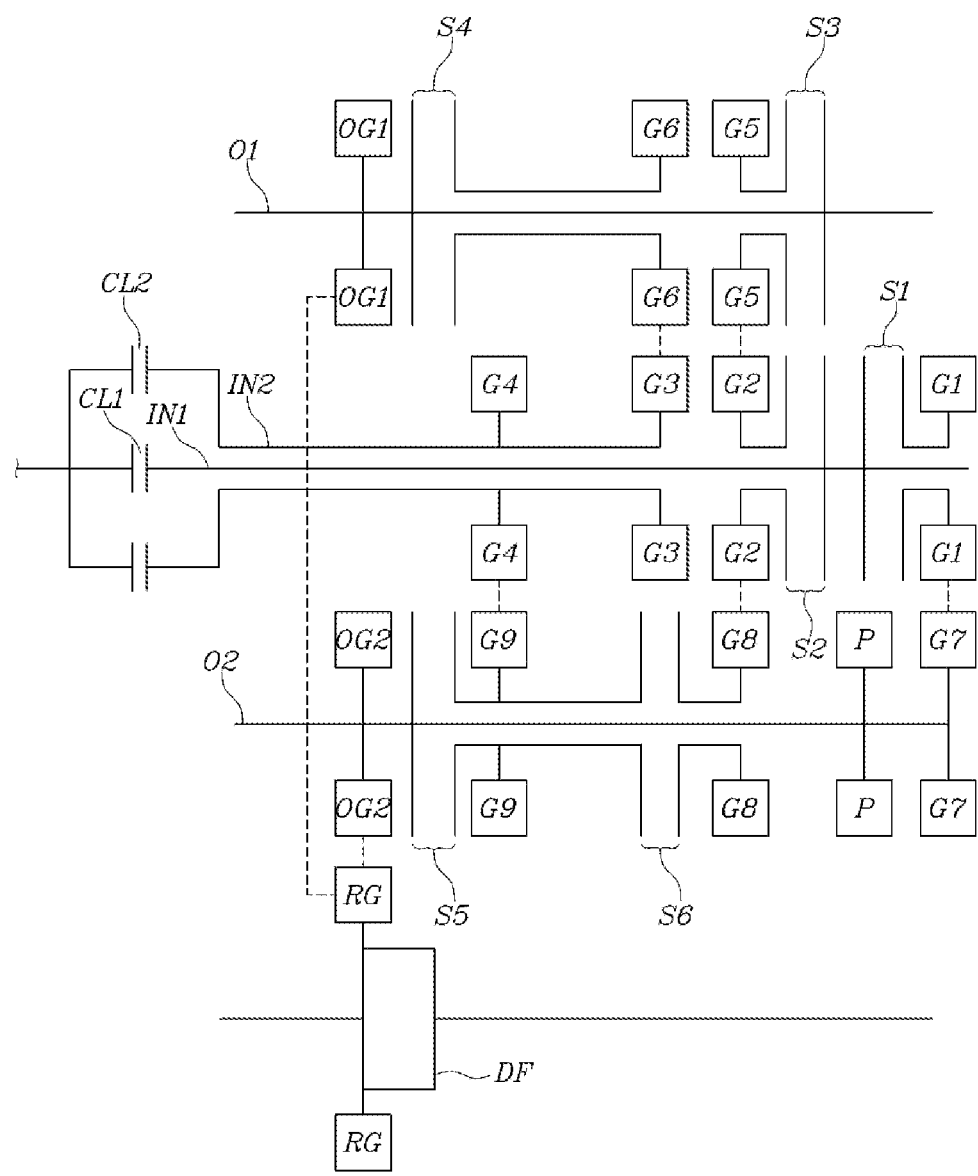
FIG. 11 is a diagram illustrating various exemplary embodiments of a dual clutch transmission according to an exemplary embodiment of the present invention.
Figure 12:
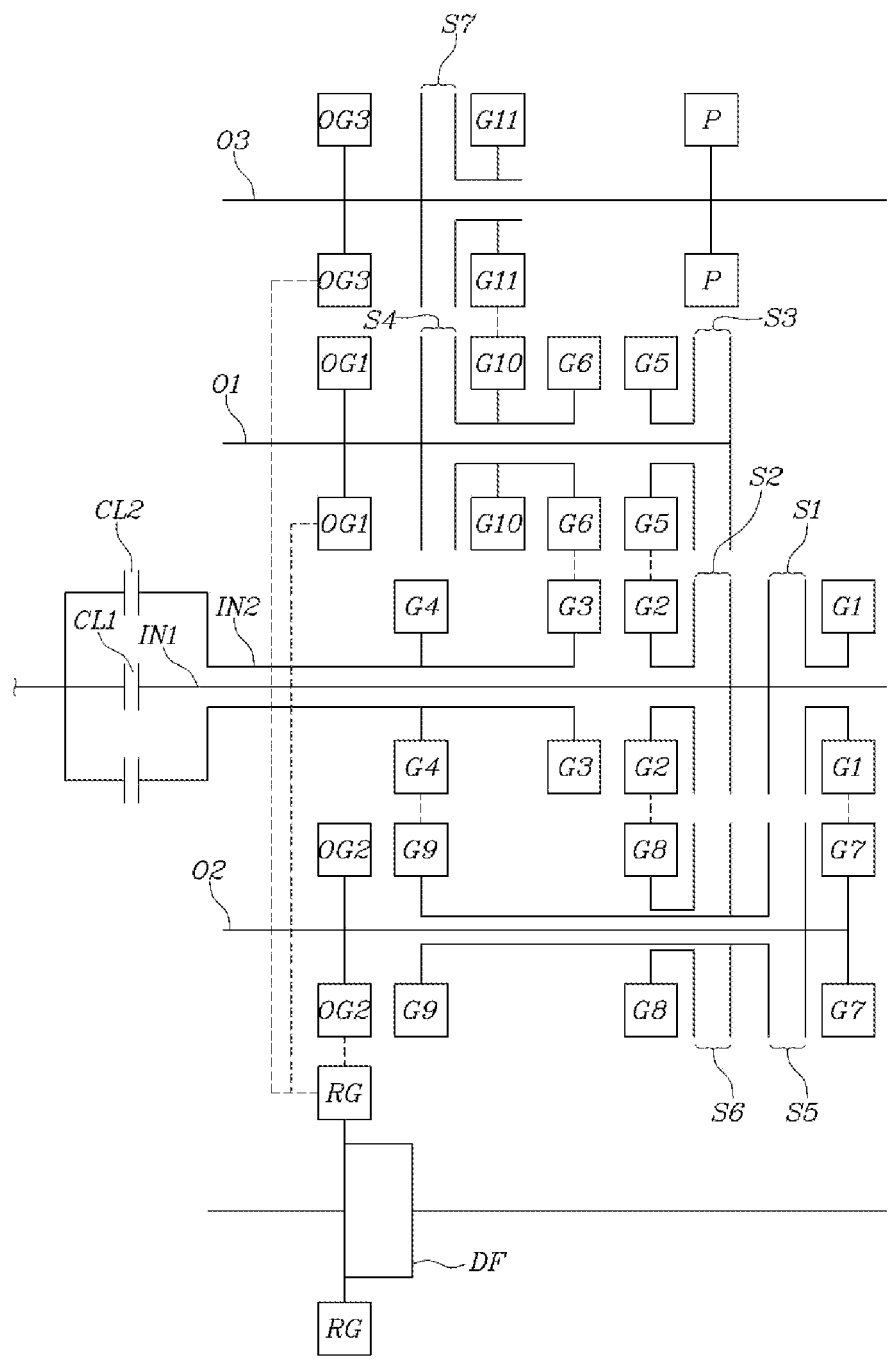
FIG. 12 is a diagram illustrating various exemplary embodiments of a dual clutch transmission according to an exemplary embodiment of the present invention.
Figure 13:
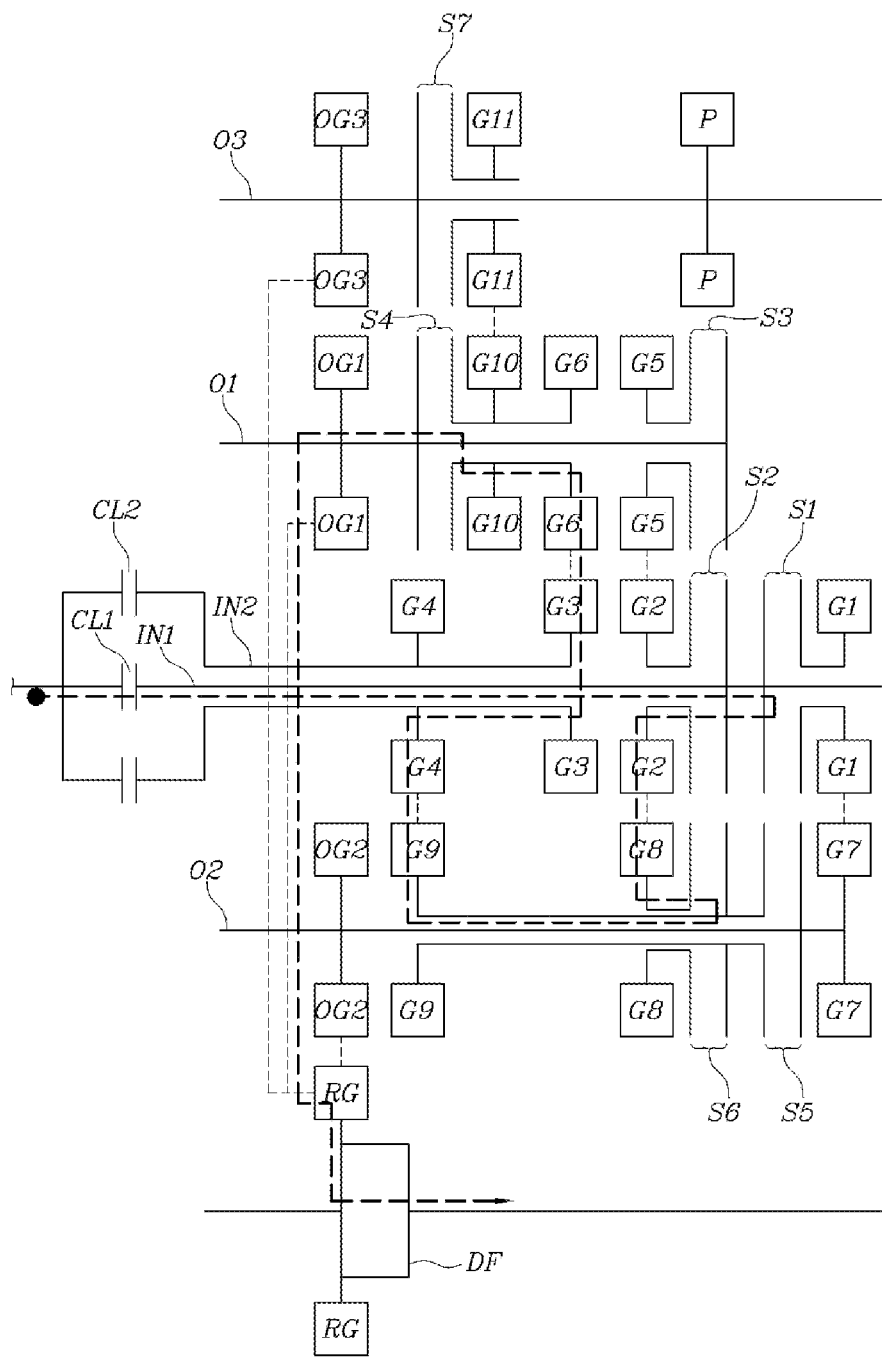
FIG. 13 is a diagram illustrating a first gear position realized by the transmission illustrated in FIG. 12.
Figure 14:
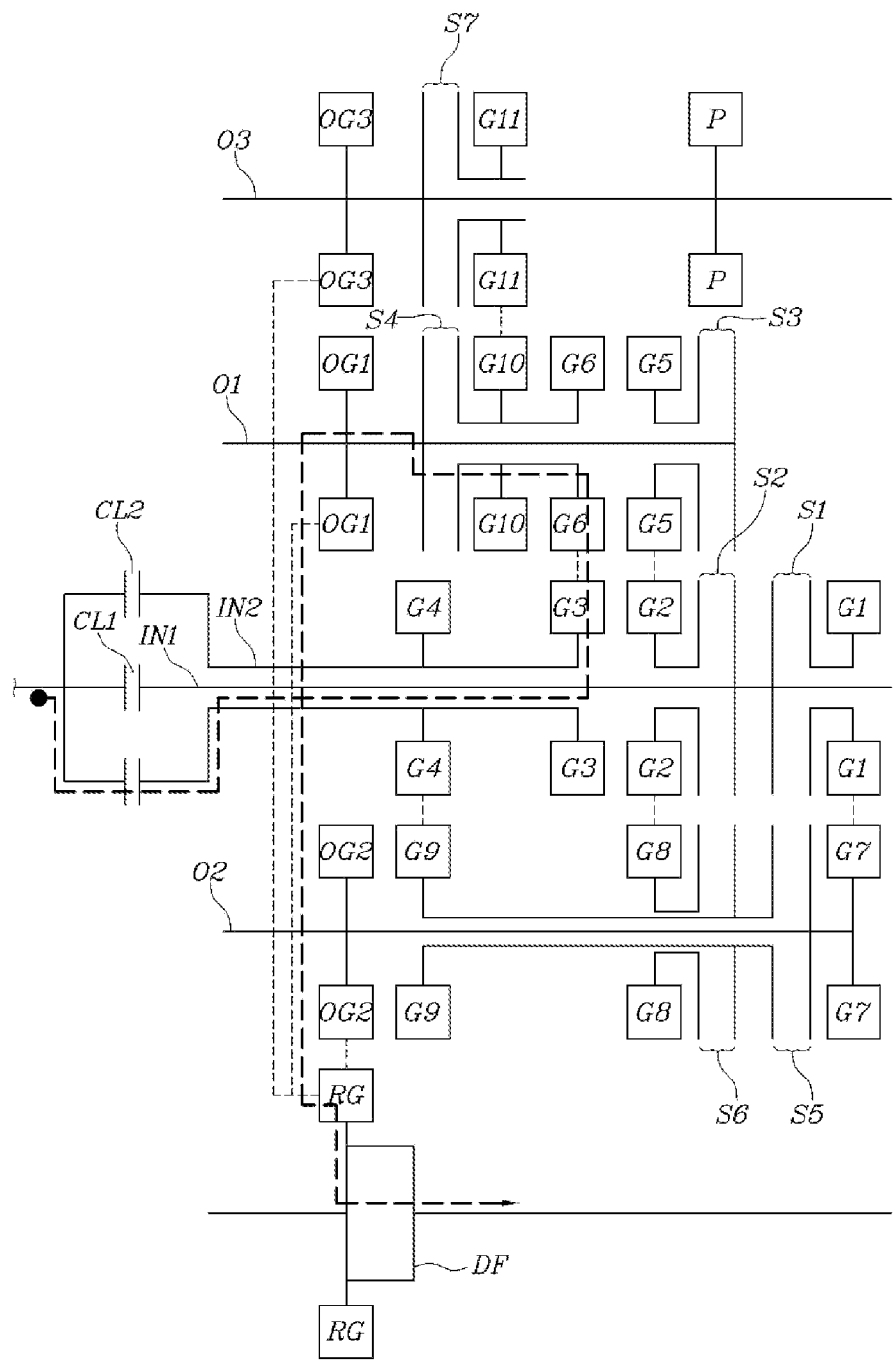
FIG. 14 is a diagram illustrating a second gear position realized by the transmission illustrated in FIG. 12.
Figure 15:
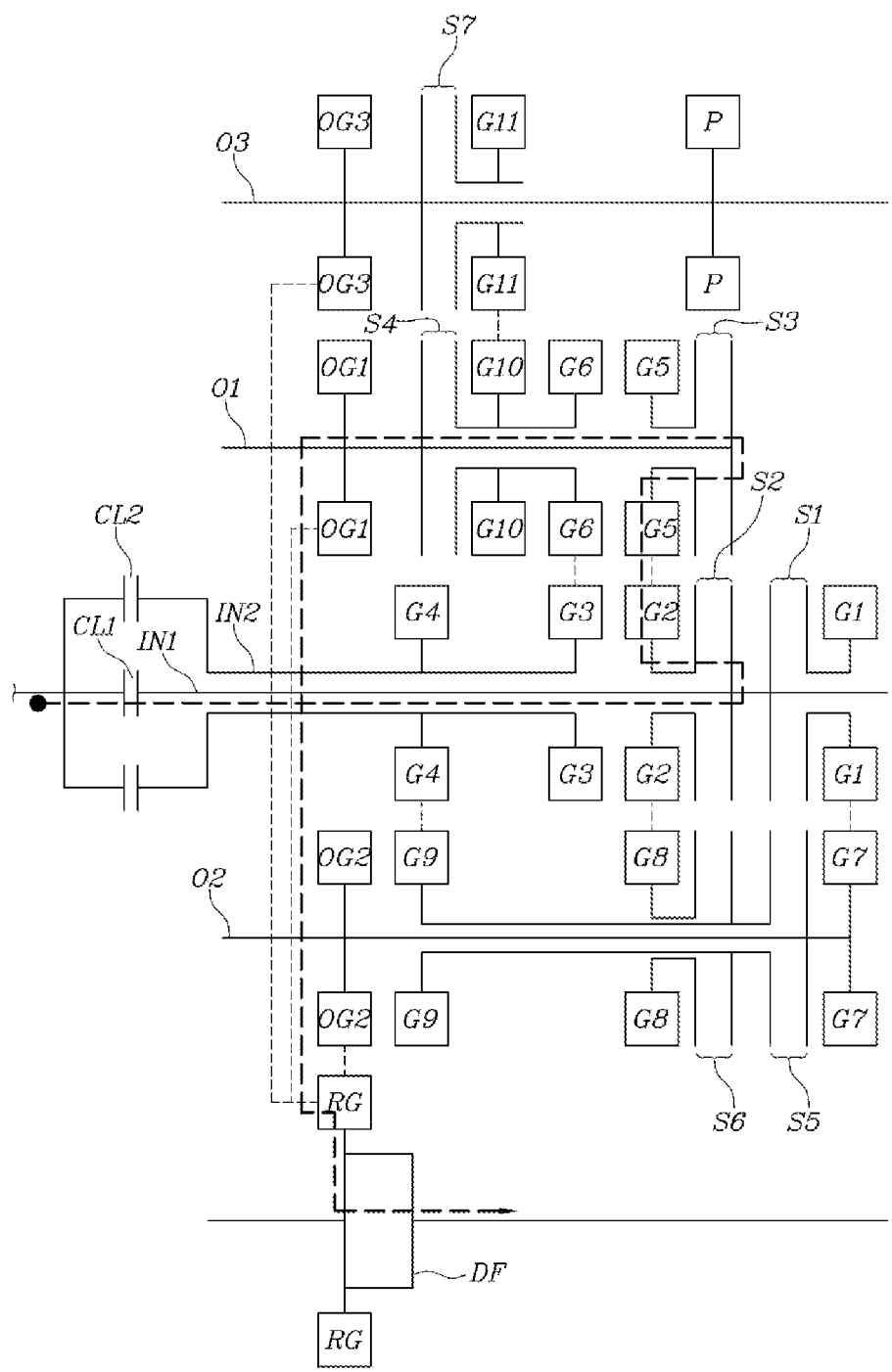
FIG. 15 is a diagram illustrating a third gear position realized by the transmission illustrated in FIG. 12.
Figure 16:
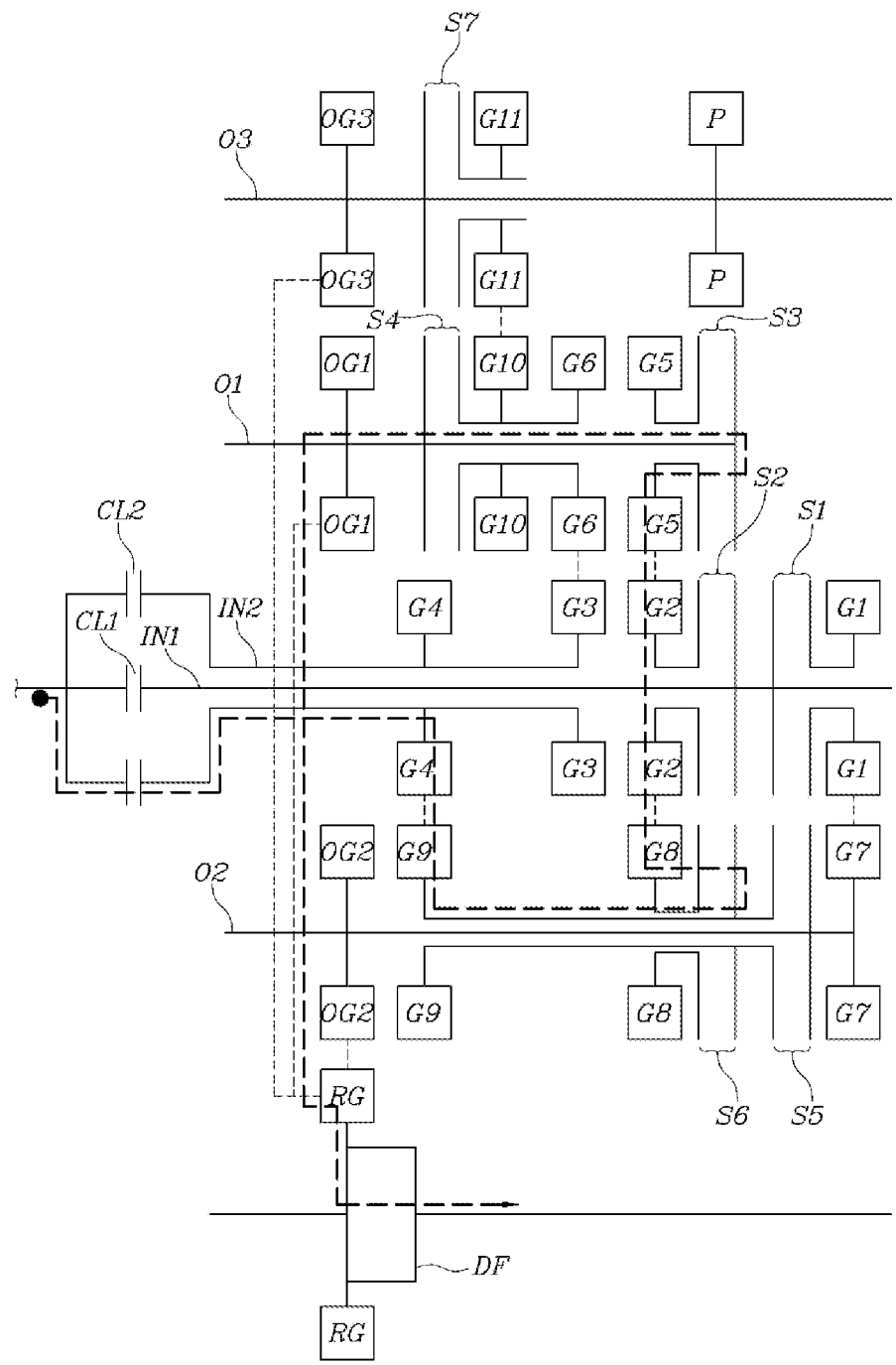
FIG. 16 is a diagram illustrating a fourth gear position realized by the transmission illustrated in FIG. 12.
Figure 17:
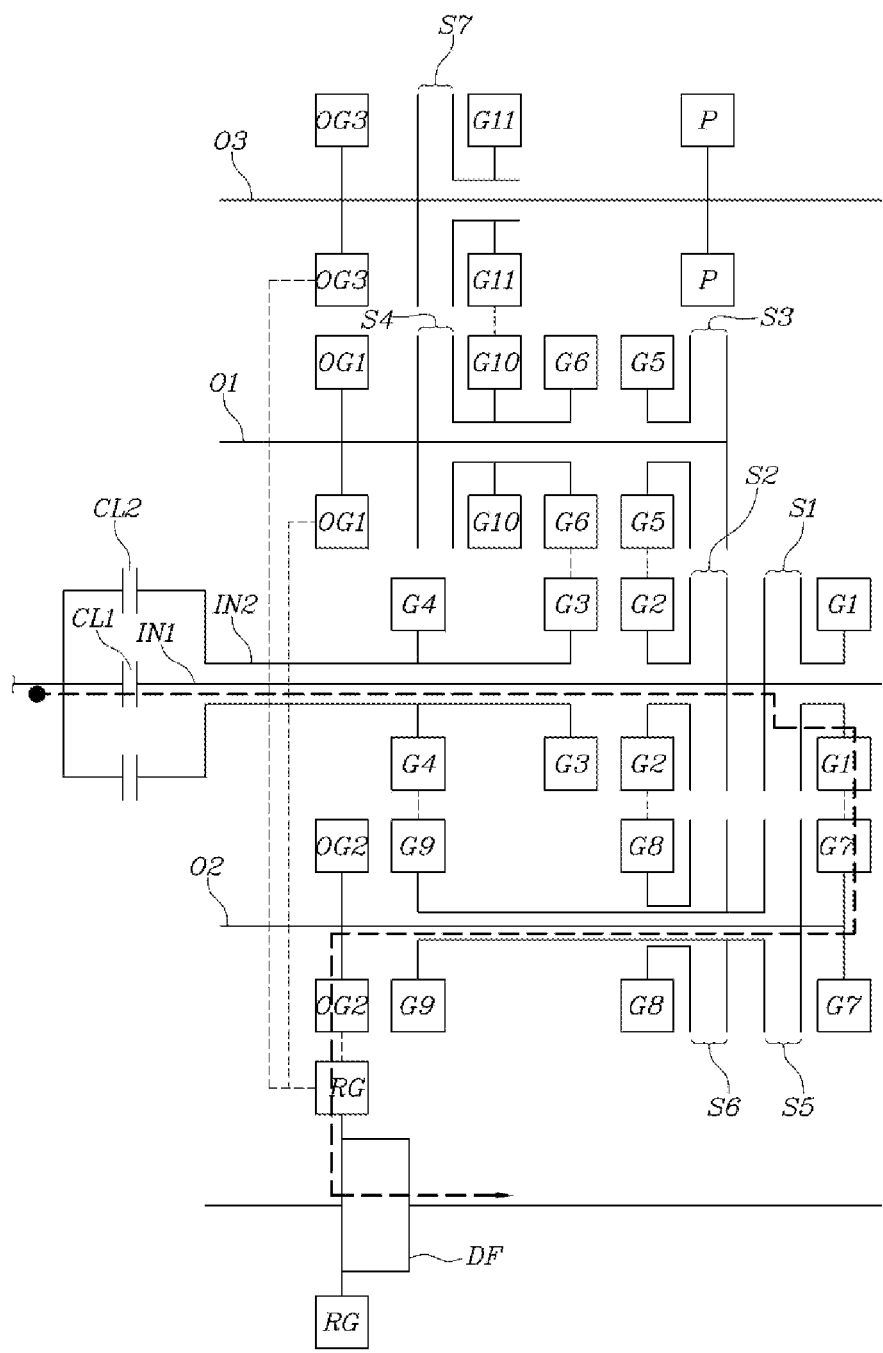
FIG. 17 is a diagram illustrating a fifth gear position realized by the transmission illustrated in FIG. 12.
Figure 18:
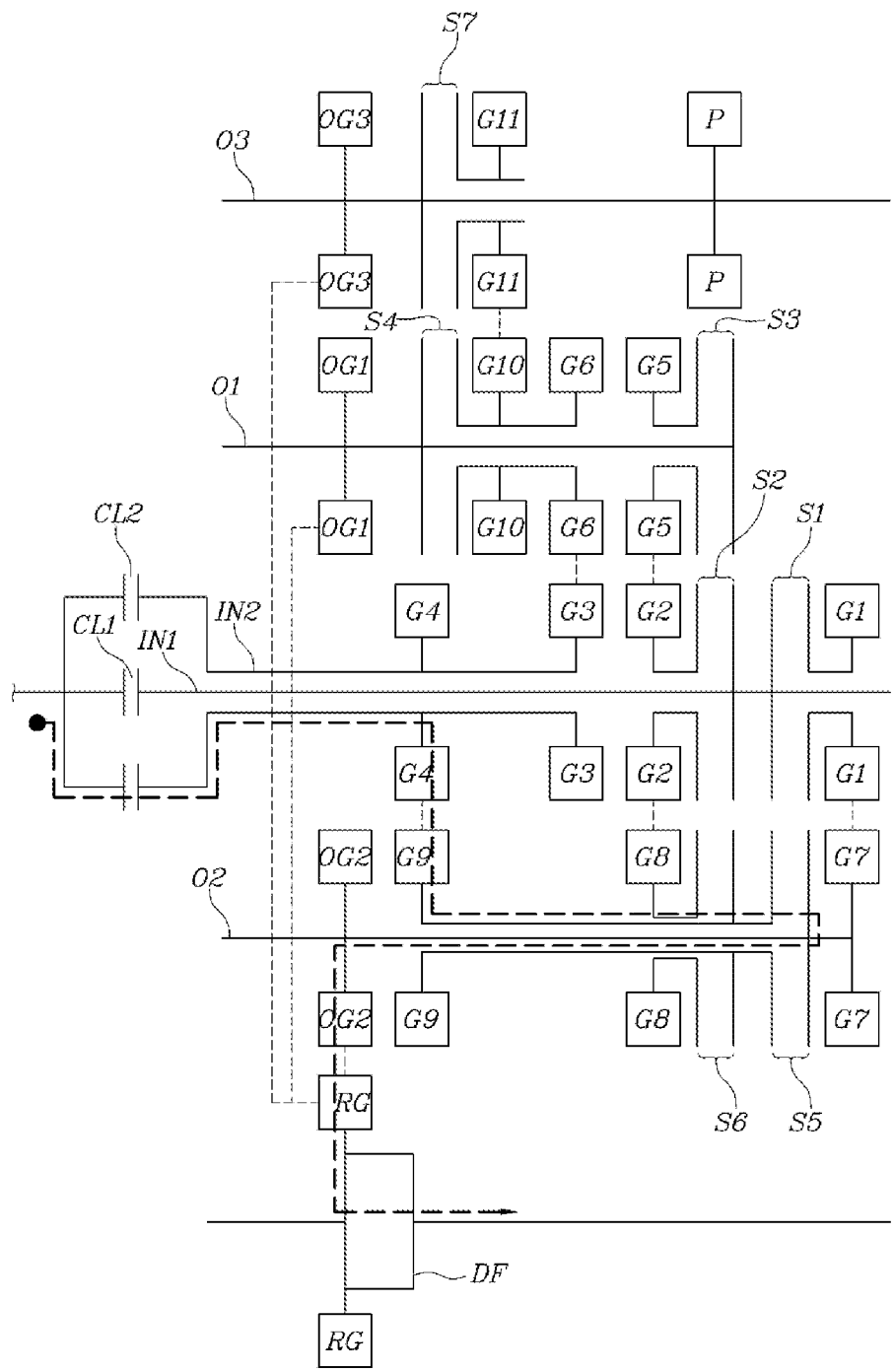
FIG. 18 is a diagram illustrating a sixth gear position realized by the transmission illustrated in FIG. 12.
Figure 19:
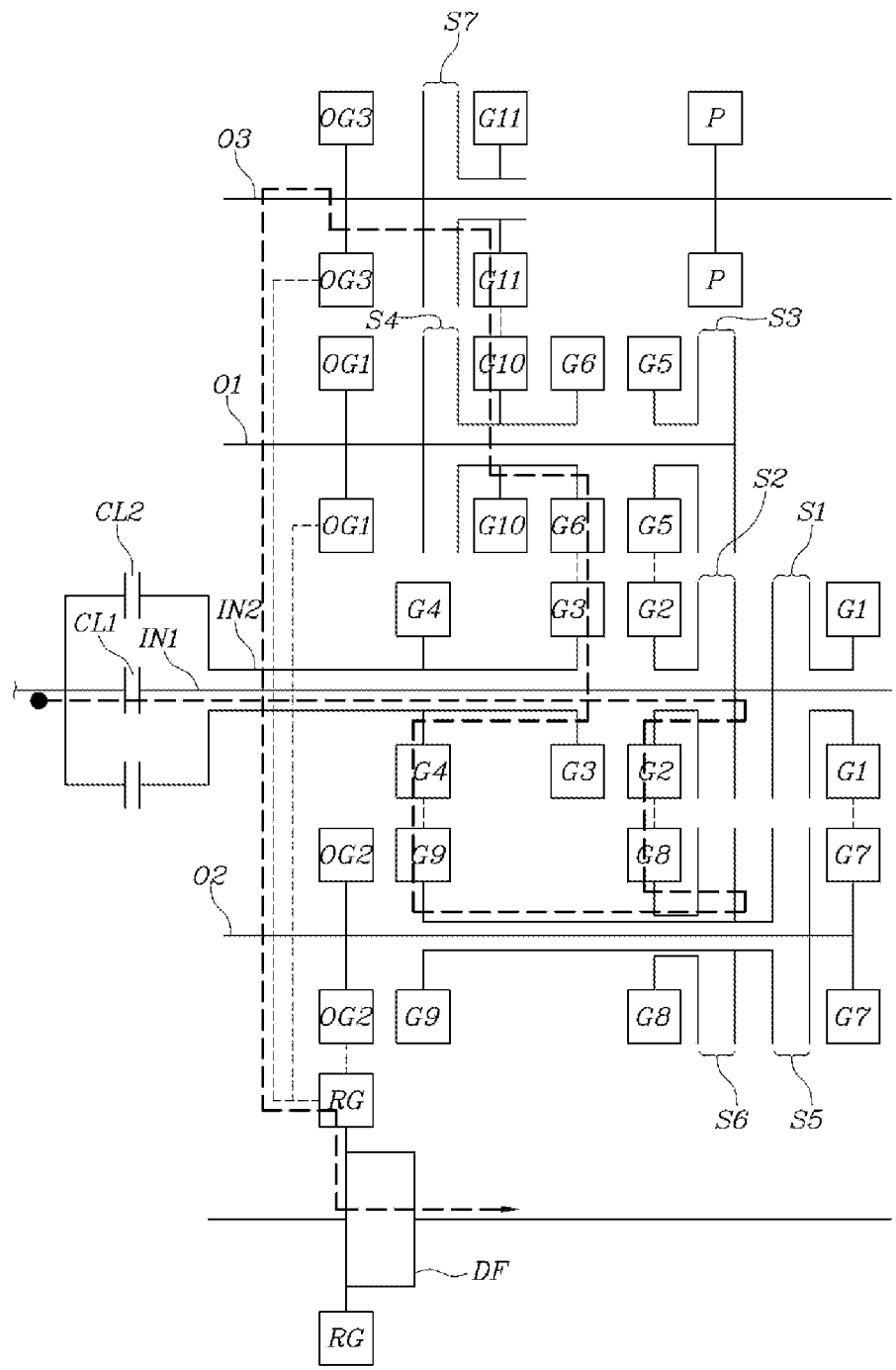
FIG. 19 is a diagram illustrating a reverse gear position realized by the transmission illustrated in FIG. 12.

In the various exemplary embodiments of the present invention in FIGS. 1, 11 and 12, the second input shaft IN2 is provided as a hollow shaft surrounding the first input shaft IN1, while the first gear, the second gear, the third gear and the fourth gear G1 to G4 are mounted sequentially in the axial direction thereof.

Figure 20:
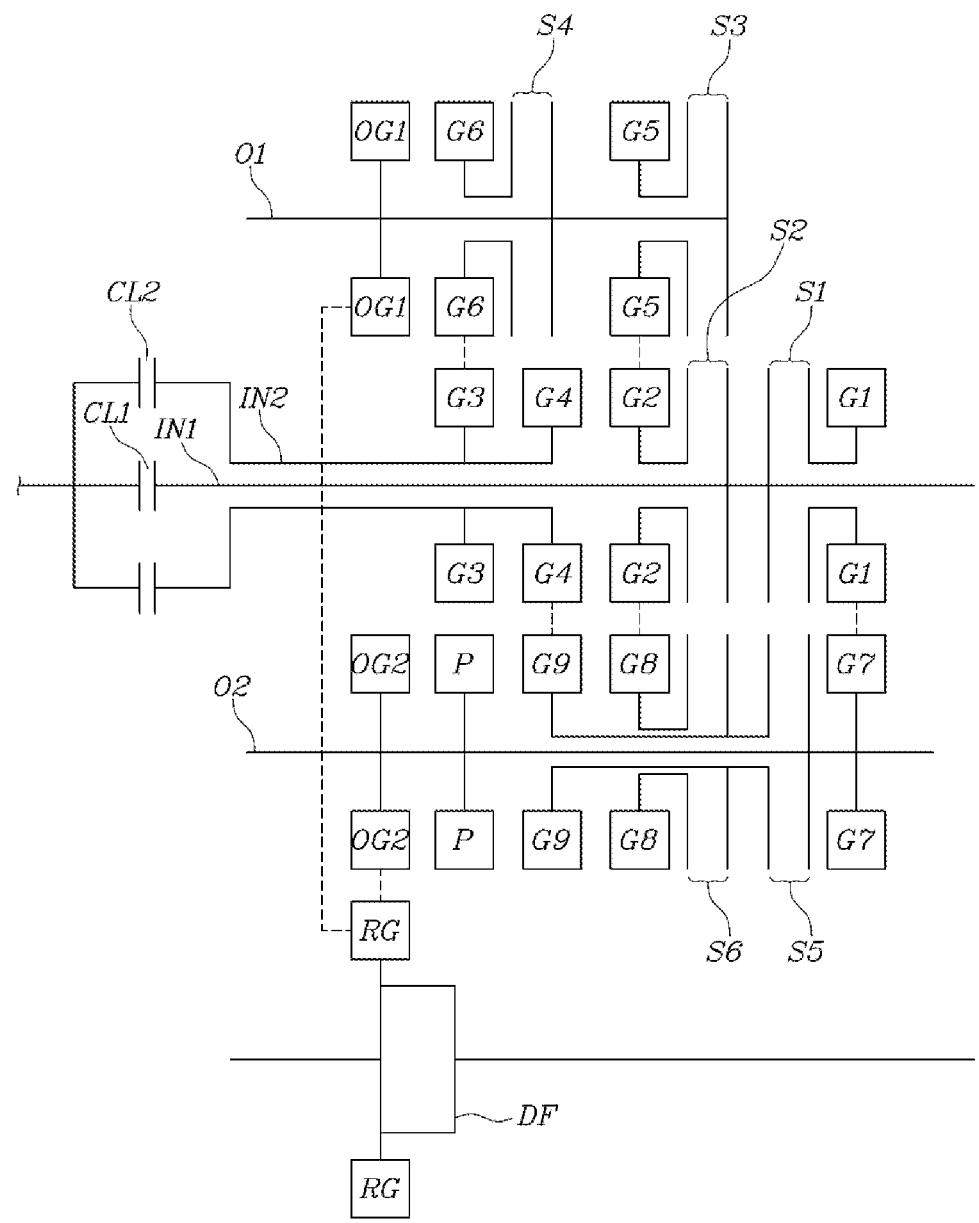
FIG. 20 is a diagram illustrating various exemplary embodiments of a dual clutch transmission according to an exemplary embodiment of the present invention.

Here, the positions of the third gear G3 and the fourth gear G4 according to the various exemplary embodiments in FIG. 20, are exchanged compared to the cases of the remaining embodiments. Details of the various exemplary embodiments will be described separately later.

A first synchronizer S1 configured for restraining the rotation of the first gear G1 to the first input shaft IN1 is provided between the first gear G1 and the second gear G2, and a second synchronizer S2 configured for restraining the rotation of the second gear G2 to the first input shaft IN1 is provided between the first synchronizer S1 and the second gear G2.

That is the first synchronizer S1 and the second synchronizer S2 are provided sequentially between the first gear G1 and the second gear G2.

For reference, the "synchronizer" conventionally has been a device including a sleeve provided to engage or disengage a hub rotating integrally with a shaft and a clutch gear rotatable relative to the shaft while sliding in the axial direction between the hub and the clutch gear. In general, the synchronizer further includes a synchronizer ring performing a synchronizing action in a response to the movement of the sleeve.

However, recently, hybrid vehicles, electric vehicles, or the like may perform the synchronizing action by actively and precisely controlling the motor without being provided with an additional synchronizer ring. Considering that the present invention is applicable to such vehicles, the "synchronizer" in an exemplary embodiment of the present invention may not be interpreted as referring to a device necessarily including the synchronizer ring.

In the drawings, the synchronizer is designated with two adjacent straight lines drawn perpendicularly to the axial direction thereof. The two straight lines may be regarded as indicating a hub and a clutch gear of the related art, or may be understood as a simple diagram indicating a structure in which a sleeve is mounted on one of the two straight lines to be slidable in the axial direction while being coupled to the other straight line.

The first output shaft O1 is provided with a third synchronizer S3 configured for restraining the rotation of the fifth gear G5 to the first output shaft O1 and a fourth synchronizer S4 configured for restraining the rotation of the sixth gear G6 to the first output shaft O1. The fifth gear G5 and the sixth gear G6 are located between the third synchronizer S3 and the fourth synchronizer S4.

The second output shaft O2 is provided with a fifth synchronizer S5 configured for restraining the ninth gear G9 to the second output shaft O2. A sixth synchronizer S6 configured for connecting the eighth gear G8 and the ninth gear G9 is provided between the eighth gear G8 and the ninth gear G9.

The features as described above are common to the various exemplary embodiments of the present invention.

Commonly in the various exemplary embodiments of the present invention in FIGS. 1 and 11, the eighth gear G8 is rotatably mounted on the second output shaft O2, and the sixth synchronizer S6 is a component provided along the axial direction between the eighth gear G8 and the ninth gear G9.

The various exemplary embodiments in FIG. 1, further includes a third output shaft O3 mounted in parallel to the first input shaft IN1 and including a third output gear OG3 engaged with the ring gear RG of the differential DF. A tenth gear G10 is provided between the sixth gear G6 and the fourth synchronizer S4, with the rotation of the tenth gear G10 being restrained by the sixth gear G6. An eleventh gear G11 is provided on the third output shaft O3 to be engaged with the tenth gear G10, with the rotation of the eleventh gear G11 being restrained by the third output shaft O3. These components of the various exemplary embodiments form a reverse (R) gear in FIG. 1.

The third output shaft O3 is provided with a seventh synchronizer S7 configured for restraining the rotation of the eleventh gear G11 to the third output shaft O3 and a parking gear P.

In contrast, the various exemplary embodiments in FIG. 11, is provided with neither the third output shaft O3 nor the components, of which the R gear is constituted, to provide a transmission having a simpler configuration mountable on a hybrid vehicle or an electric vehicle.

In the instant case, the R gear position may be provided by reversely rotating the motor of the hybrid vehicle or the electric vehicle in a situation in which the first gear position is realized by the transmission.

For reference, in the various exemplary embodiments of the present invention in FIG. 11, the parking gear P is mounted on the second output shaft O2.

Figure 21:
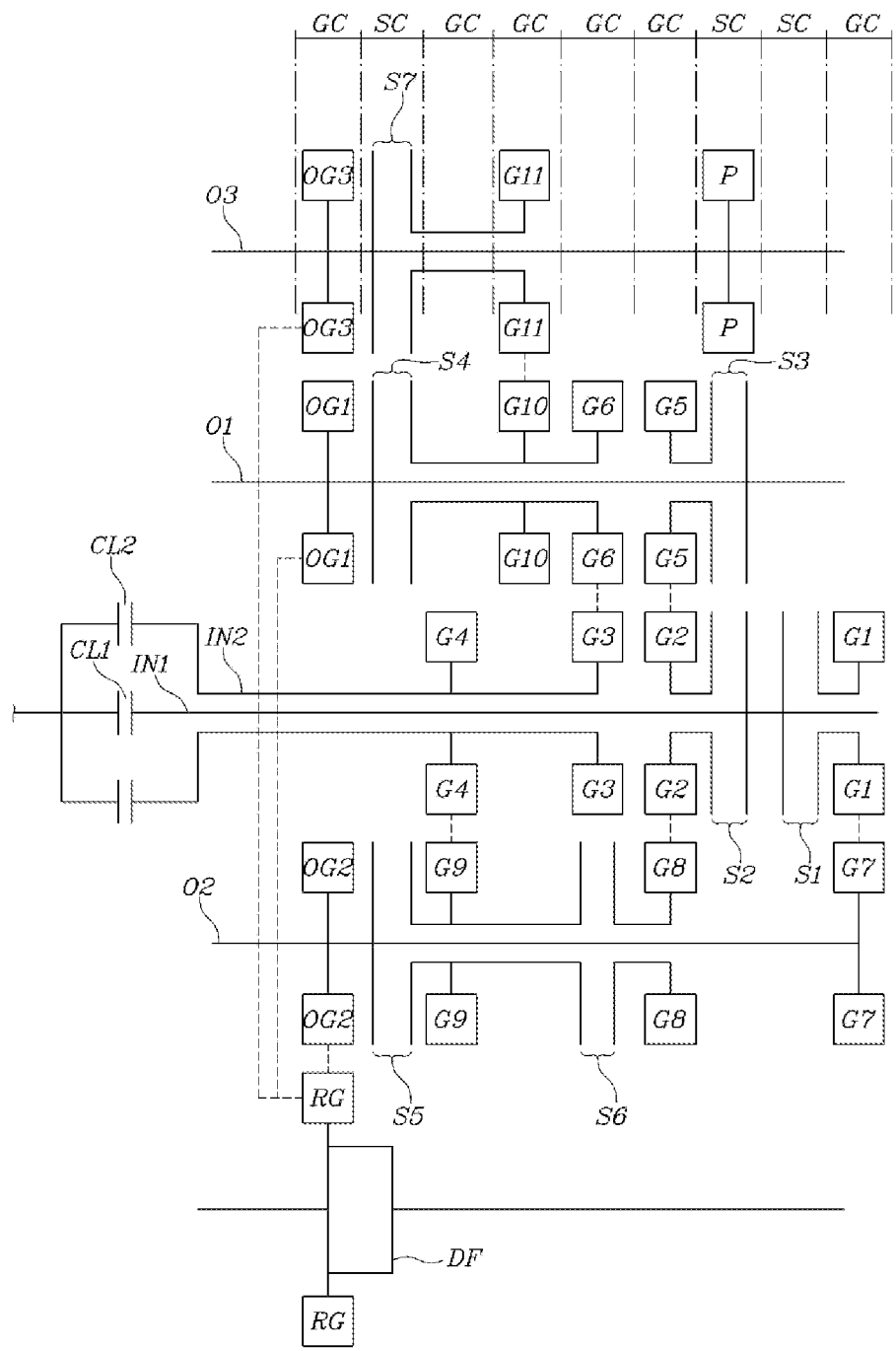
FIG. 21 is a diagram illustrating gear columns and sleeve columns of the various exemplary embodiments of the dual clutch transmission according to an exemplary embodiment of the present invention.

In the various exemplary embodiments as described above in FIGS. 1 and 11, only a total of six (6) gear columns GC, i.e., spaces occupied in the axial direction by gears engaged with each other in a direction perpendicular to the axial direction thereof, are provided, and only a total of three (3) sleeve columns SC, i.e., spaces occupied by the synchronizers in the axial direction thereof, are provided, in addition to the spaces occupied by the gear columns GC in the axial direction thereof, such that all of the transmission gear positions of six (6) forward gear positions and a single reverse (R) gear position may be realized. Accordingly, a relatively large number of transmission gear positions may be realized while the length of the transmission is relatively short (see FIG. 21).

Here, the "gear column" refers to a space which may be obtained in the transmission, in consideration of the minimum axial length necessary for a portion of the transmission, with which gears are engaged to form a transmission gear position, to realize a required level of strength. The "sleeve column" is a space which may be obtained in the transmission by counting portions not overlapping the gear column, in consideration of the minimum axial length necessary for the sleeve of the synchronizer to engage or disengage two rotating bodies by axial movement.

Commonly in the various exemplary embodiments illustrated in FIG. 12 and the various exemplary embodiments illustrated in FIG. 20, the eighth gear G8 is rotatably mounted on an external region of a portion connecting the ninth gear G9 and the fifth synchronizer S5, and the sixth synchronizer S6 is provided in the axial direction of the second output shaft O2, between the eighth gear G8 and the fifth synchronizer S5.

The various exemplary embodiments in FIG. 12, further includes a third output shaft O3 mounted in parallel to the first input shaft IN1 and including a third output gear OG3 engaged with the ring gear RG of the differential DF. A tenth gear G10 is provided between the sixth gear G6 and the fourth synchronizer S4, with the rotation of the tenth gear G10 being restrained by the sixth gear G6. An eleventh gear G11 is provided on the third output shaft O3 to be engaged with the tenth gear G10, with the rotation of the eleventh gear G11 being restrained by the third output shaft O3. These components of the various exemplary embodiments form a reverse (R) gear in FIG. 12.

The third output shaft O3 is provided with a seventh synchronizer S7 configured for restraining the rotation of the eleventh gear G11 to the third output shaft O3 and a parking gear P.

Figure 22:
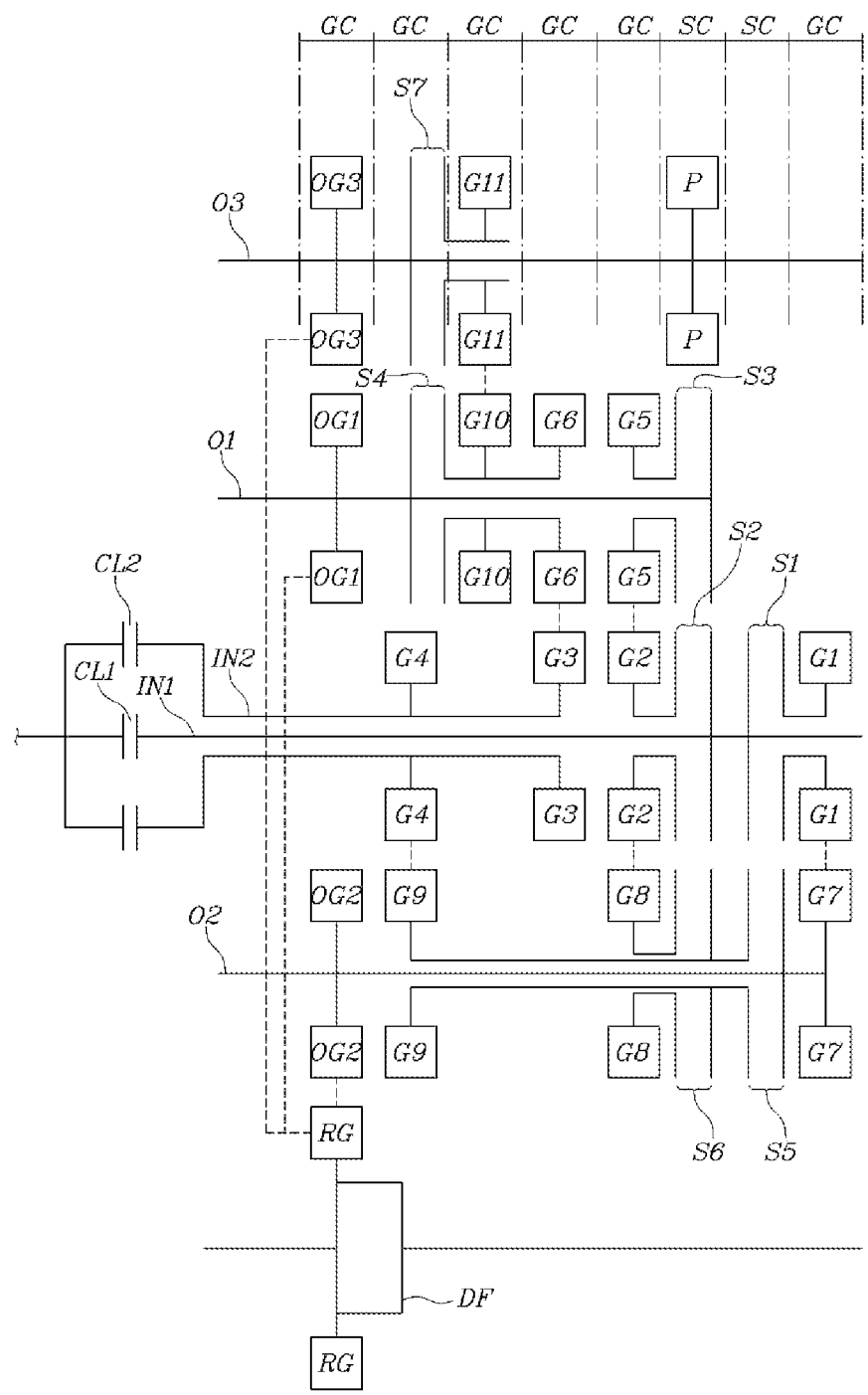
FIG. 22 is a diagram illustrating gear columns and sleeve columns of the various exemplary embodiments of the dual clutch transmission according to an exemplary embodiment of the present invention.

In the various exemplary embodiments of the present invention in FIG. 12, only a total of six (6) gear columns GC, i.e., spaces occupied in the axial direction by gears engaged with each other in a direction perpendicular to the axial direction thereof, are provided, and only a total of two (2) sleeve columns SC, i.e., spaces occupied by the synchronizers in the axial direction thereof, are provided, in addition to the spaces occupied by the gear columns GC in the axial direction thereof, such that all of the transmission gear positions of 6 forward gear positions and a single reverse gear position may be realized (see FIG. 22).

That is, the various exemplary embodiments in FIG. 12, may realize all of the transmission gear positions of the 6 forward gear positions and the single reverse gear position in the same manner as the various exemplary embodiments in FIGS. 1 and 11, and the various exemplary embodiments while having a shorter length than those of the various exemplary embodiments and the various exemplary embodiments in FIGS. 1 and 11.

Furthermore, the various exemplary embodiments in FIG. 20, is provided with neither the third output shaft O3 nor the components, of which the R gear is constituted, to provide a transmission having a simpler configuration mountable on a hybrid vehicle or an electric vehicle.

In the instant case, the R gear position may be provided by reversely rotating the motor of the hybrid vehicle or the electric vehicle in a situation in which the first gear position is realized by the transmission.

For reference, in the various exemplary embodiments of the present invention in FIG. 20, the parking gear P is mounted on the second output shaft O2.

In addition to the above described feature of the various exemplary embodiments of the present invention in FIG. 20, in which the positions of the third gear and the fourth gear being exchanged compared to the cases of the remaining embodiments, the various exemplary embodiments in FIG. 20 differ from the remaining embodiments in that the first output shaft is provided with the third synchronizer selectively restraining the rotation of the fifth gear to the first output shaft and the fourth synchronizer selectively restraining the rotation of the sixth gear to the first output shaft, wherein the fifth gear is located between the third synchronizer and the fourth synchronizer, and the fourth synchronizer is located between the fifth gear and the sixth gear.

The various exemplary embodiments in FIG. 20 as described above may realize all of transmission gear positions of 6 forward gear positions and a single reverse gear position while being provided with only a total of 5 gear columns GC and only a total of 2 sleeve columns. Accordingly, the various exemplary embodiments in FIG. 20 may provide a transmission that has a shortest length while being able to realize the same number of transmission gear positions.

Hereinafter, the first to sixth forward gear positions and the reverse gear position realized by the dual clutch transmission according to the various exemplary embodiments of the present invention in FIG. 1 will be described with reference to FIGS. 2 to 10.

Figure 2:
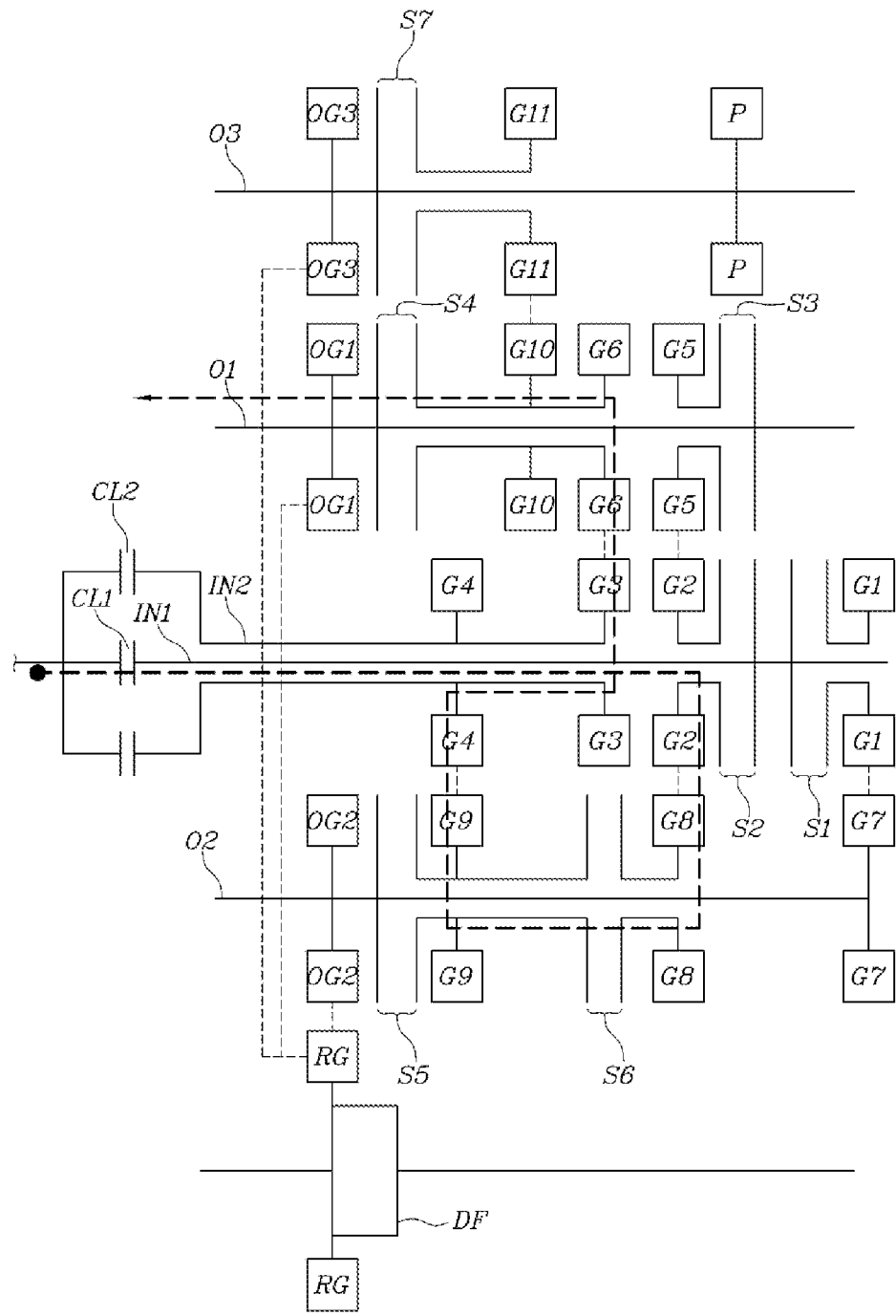
FIG. 2 is a diagram illustrating a first gear position realized by the transmission illustrated in FIG. 1.

FIG. 2 illustrates the first gear position realized by the transmission. Referring to FIG. 2, power supplied to the first input shaft IN1 through the first clutch CL1 is transferred to the ring gear RG of the differential DF sequentially through the second synchronizer S2, the second gear G2, the eighth gear G8, the sixth synchronizer S6, the ninth gear G9, the fourth gear G4, the third gear G3, the sixth gear G6, and the fourth synchronizer S4.

That is, the transmission may realize a first transmission ratio by combining a plurality of gears instead of being provided with a separate first transmission gear realizing the first transmission ratio.

Figure 3:
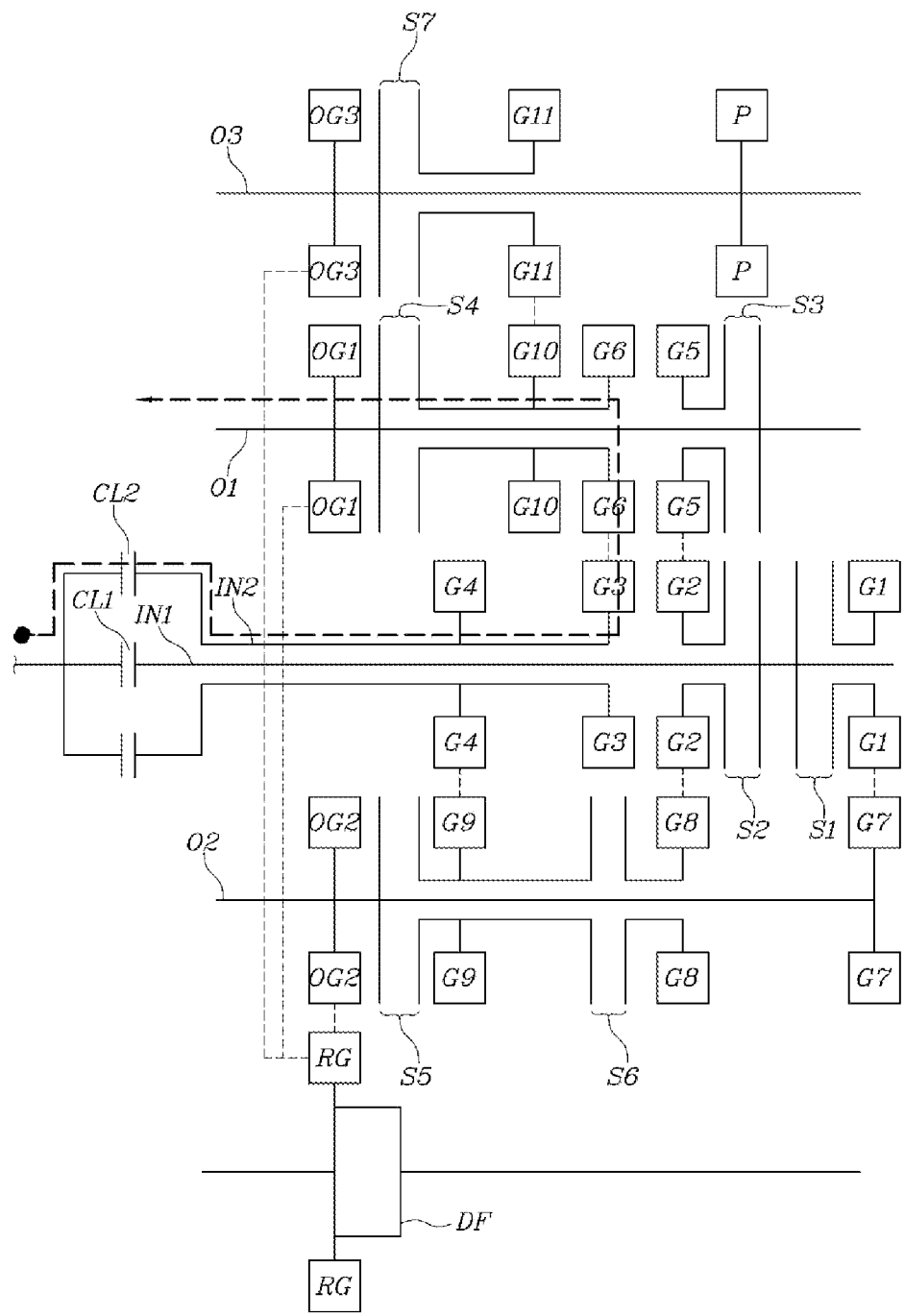
FIG. 3 is a diagram illustrating a second gear position realized by the transmission illustrated in FIG. 1.

FIG. 3 illustrates the second gear position realized by the transmission. Referring to FIG. 3, a shift from the first gear position to the second gear position is realized by connecting the second clutch CL2 while disconnecting the first clutch CL1. Power is transferred to the second input shaft IN2 through the second clutch CL2 and is then transferred to the differential DF sequentially through the third gear G3, the sixth gear G6, and the fourth synchronizer S4.

Figure 4:
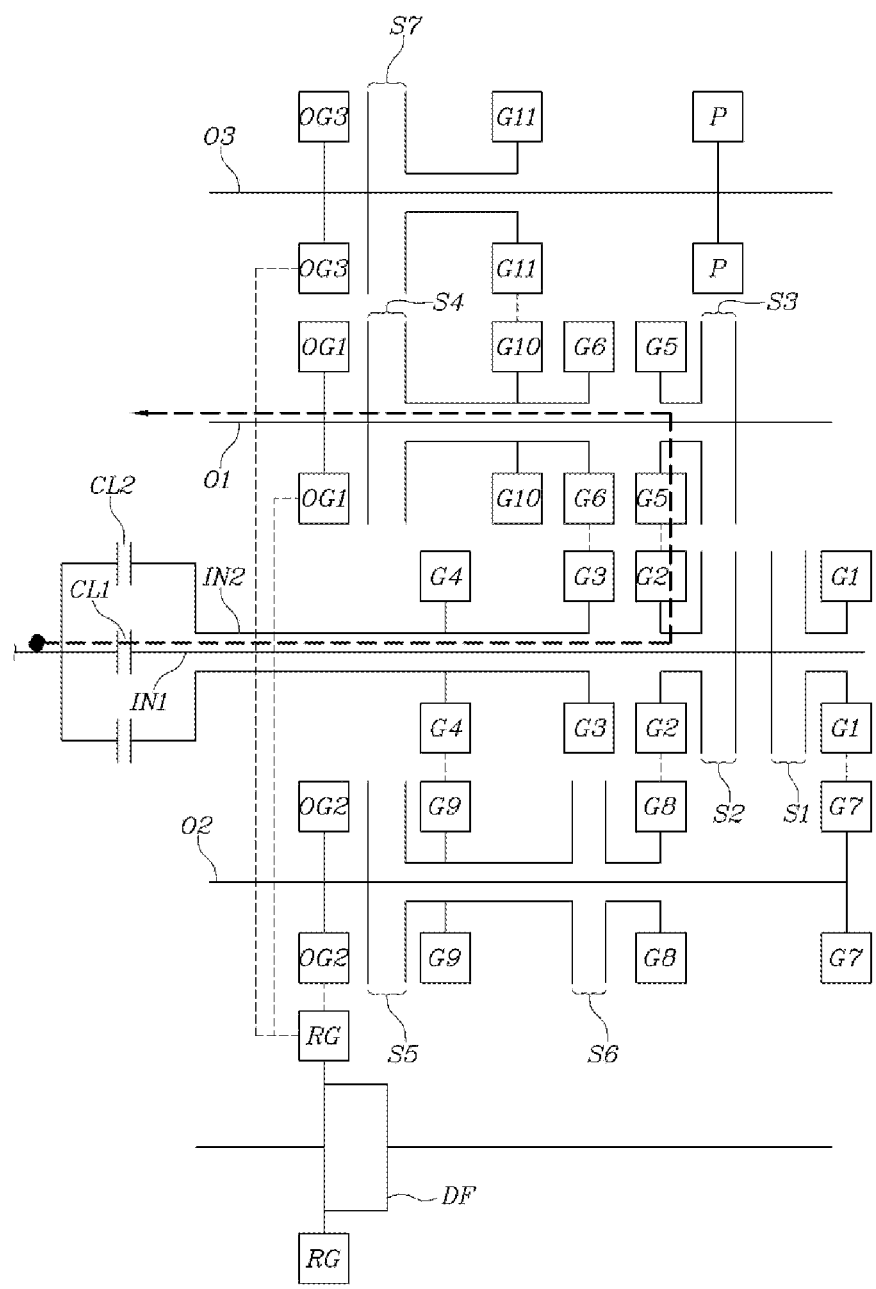
FIG. 4 is a diagram illustrating a third gear position realized by the transmission illustrated in FIG. 1.

FIG. 4 illustrates the third gear position realized by the transmission. Referring to FIG. 4, the transmission may realize a shift from the second gear position to the third gear position by connecting the first clutch CL1 while disconnecting the second clutch CL2 in a state in which a third gear power path is provided by pre-engagement of the second synchronizer S2 and the third synchronizer S3.

Power transferred to the first input shaft IN1 is transferred to the differential DF sequentially through the second synchronizer S2, the second gear G2, the fifth gear G5, and the third synchronizer S3.

Figure 5:
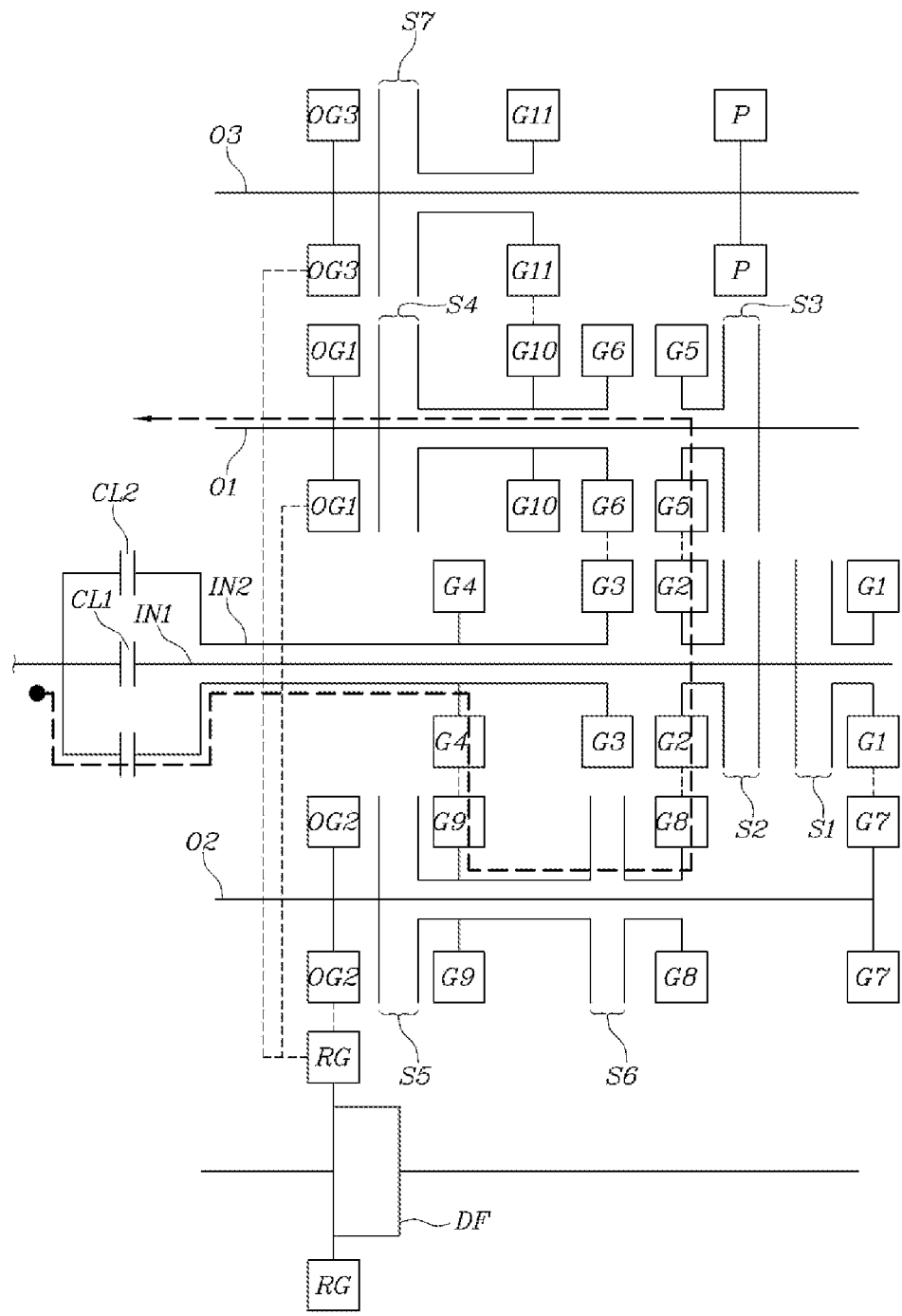
FIG. 5 is a diagram illustrating a fourth gear position realized by the transmission illustrated in FIG. 1.

FIG. 5 illustrates the fourth gear position realized by the transmission. Referring to FIG. 5, the transmission may realize the fourth gear position by combining a plurality of gears instead of being provided with a separate fourth transmission gear realizing the fourth gear position, like the first gear position.

Power transferred to the second input shaft IN2 is transferred to the differential DF sequentially through the fourth gear G4, the sixth synchronizer S6, the eighth gear G8, the second gear G2, the fifth gear G5, and the third synchronizer S3.

Figure 6:
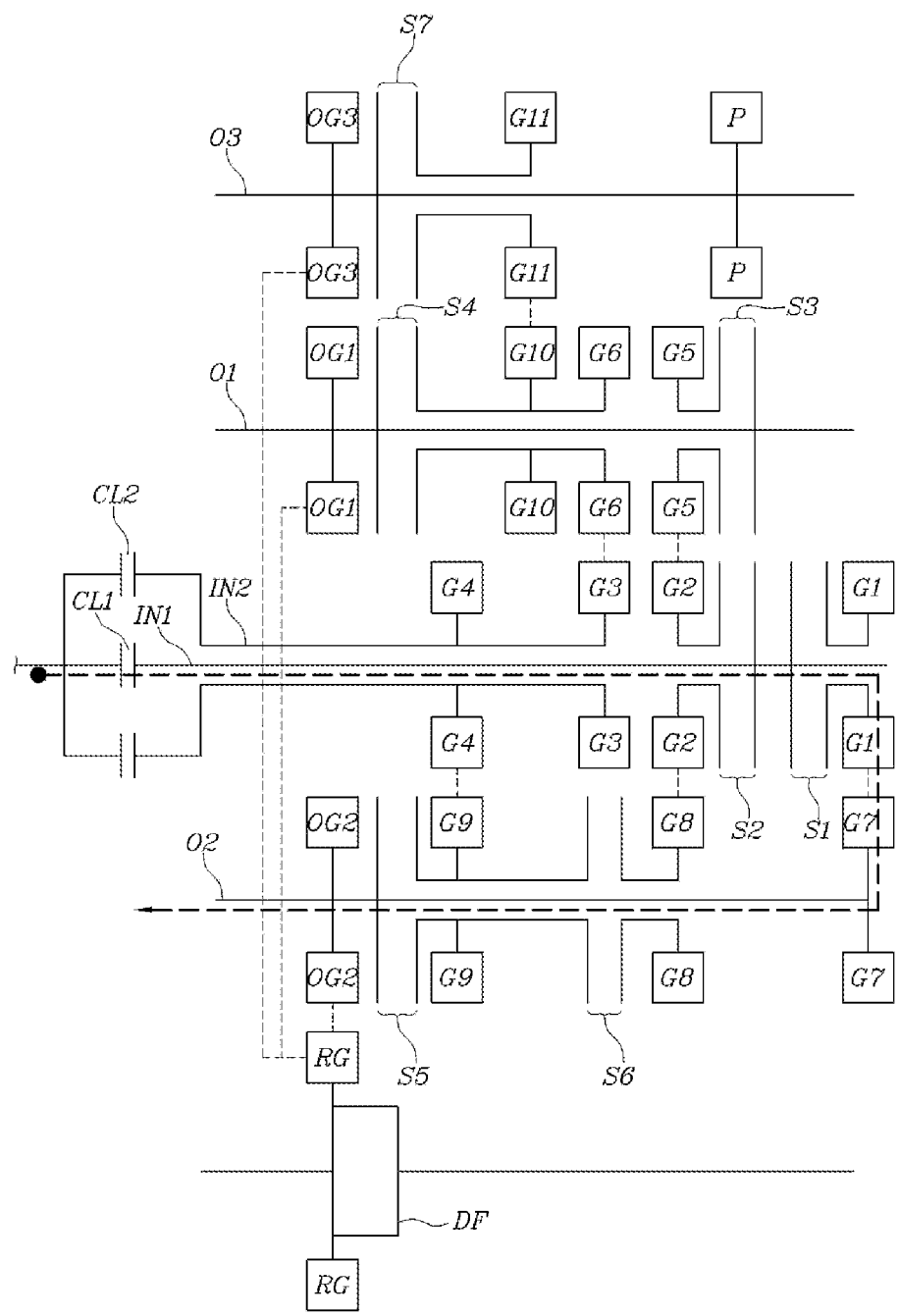
FIG. 6 is a diagram illustrating a fifth gear position realized by the transmission illustrated in FIG. 1.

FIG. 6 illustrates the fifth gear position realized by the transmission. Referring to FIG. 6, the transmission may realize a shift from the fourth gear position to the fifth gear position by pre-engaging the first synchronizer S1 and connecting the first clutch CL1 while disconnecting the second clutch CL2.

Power transferred to the first input shaft IN1 is transferred to the differential DF sequentially through the first synchronizer S1, the first gear G1, and the seventh gear G6.

Figure 7:
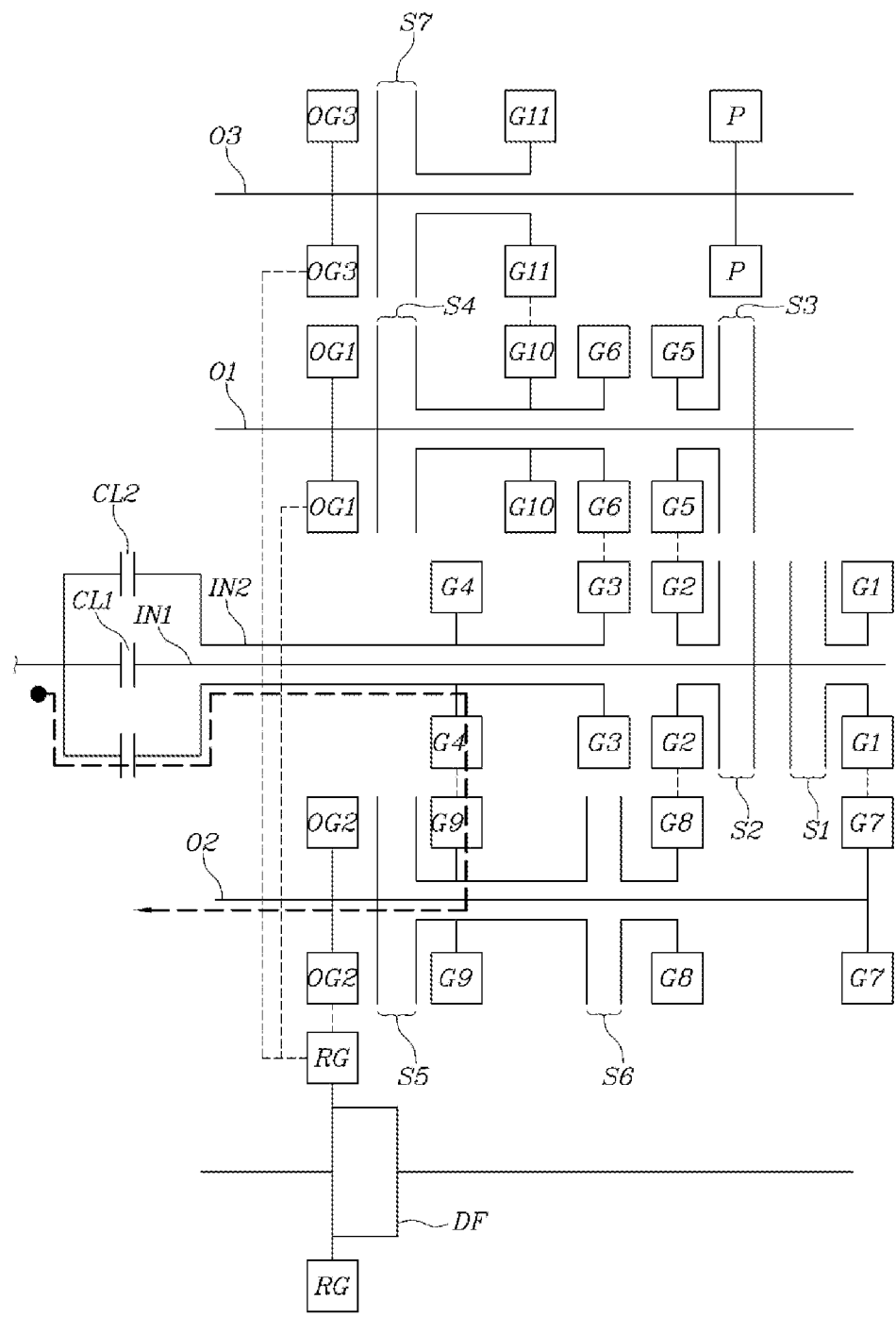
FIG. 7 is a diagram illustrating a sixth gear position realized by the transmission illustrated in FIG. 1.

FIG. 7 illustrates the sixth gear position realized by the transmission. Referring to FIG. 7, the transmission may realize a shift from the fifth gear position to the sixth gear position by pre-engaging the fifth synchronizer S5 and connecting the second clutch CL2 while disconnecting the first clutch CL1.

Power transferred to the second input shaft IN2 is output to the differential DF sequentially through the fourth gear G4, the ninth gear G9, and the fifth synchronizer S5.

Figure 8:
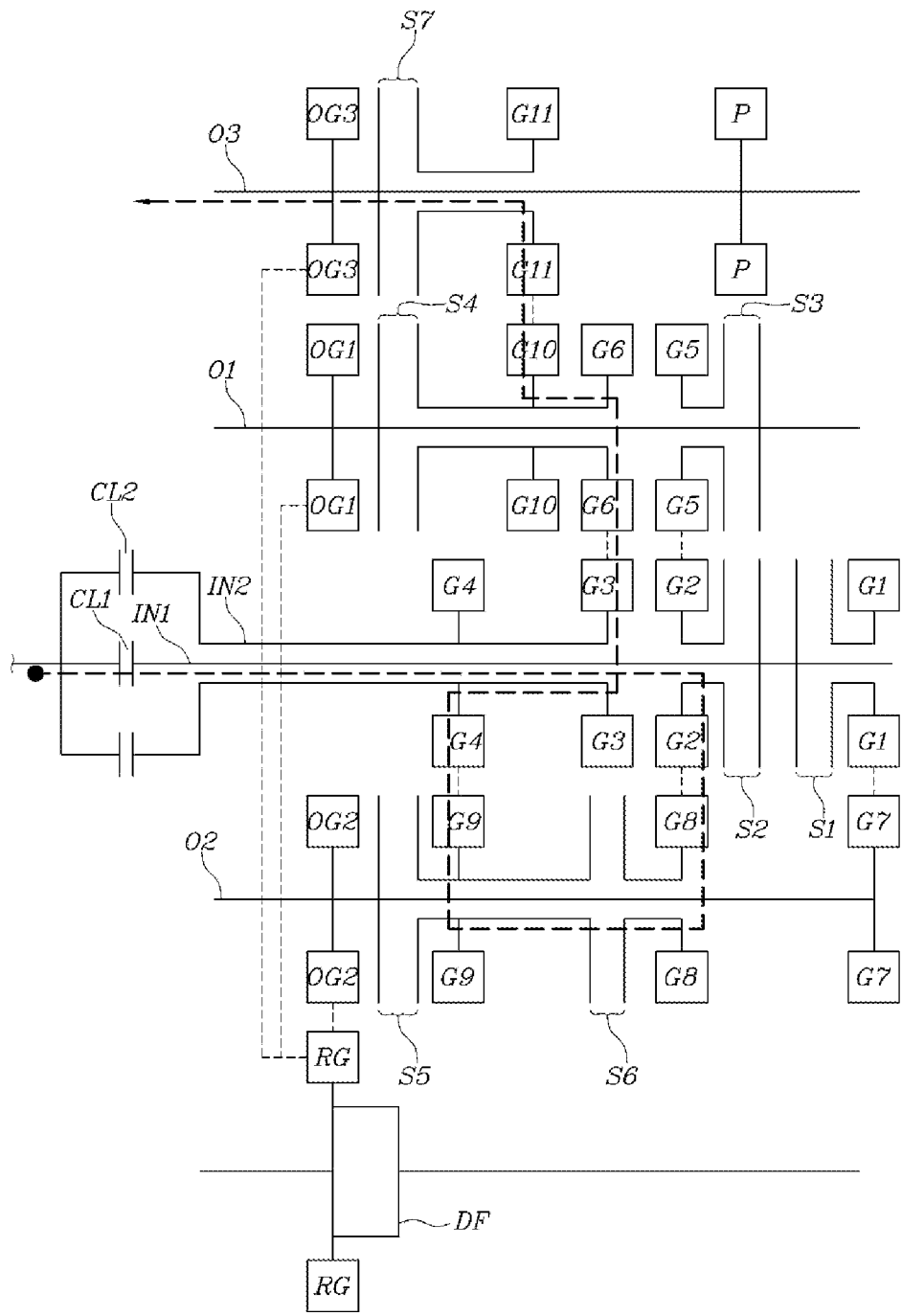
FIG. 8 is a diagram illustrating a reverse gear position realized by the transmission illustrated in FIG. 1.

FIG. 8 illustrates the reverse (R) gear position realized by the transmission. Referring to FIG. 8, power transferred to the first input shaft IN1 through the first clutch CL1 is transferred to the differential DF sequentially through the second synchronizer S2, the second gear G2, the eighth gear G8, ninth gear G9, the fourth gear G4, the third gear G3, the sixth gear G6, the tenth gear G10, the eleventh gear G11, and the seventh synchronizer S7, realizing the reverse gear position.

In the realization of the transmission gear positions as described above, the engagement of the clutches and the synchronizers may be listed as in FIG. 9. FIG. 10 illustrates power shifts without power interruption with points in the shift between the transmission gear positions.

For reference, FIG. 9 and FIG. 10 are applicable to all of the various exemplary embodiments of the present invention in FIGS. 1, 11, 12 and 20, except for the portions by which the reverse gear position are realized.

Furthermore, FIGS. 13 to 19 sequentially illustrate the first to sixth gear positions and the reverse gear position realized by the transmission of the various exemplary embodiments in FIG. 12. Specific transmission operations and power flows of the transmission of the various exemplary embodiments in FIG. 12 are substantially the same as those of the various exemplary embodiments of the present invention in FIG. 1, and detailed descriptions thereof will be omitted.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A dual clutch transmission comprising:
    a first input shaft and a second input shaft mounted concentrically to the first input shaft;
    a first output shaft and a second output shaft each mounted in parallel to the first input shaft and respectively including first and second output gears engaged with a ring gear of a differential;
    a first gear and a second gear, rotations of which are selectively restrained by the first input shaft;
    a third gear and a fourth gear, rotations of which are continuously restrained by the second input shaft;
    a fifth gear engaged with the second gear, with a rotation thereof being to be selectively restrained by the first output shaft;
    a sixth gear engaged with the third gear, with a rotation thereof being to be selectively restrained by the first output shaft;
    a seventh gear engaged with the first gear, with a rotation thereof being continuously restrained by the second output shaft;
    an eighth gear engaged with the second gear and rotatably mounted on the second output shaft; and
    a ninth gear engaged with the fourth gear and rotatably mounted on the second output shaft, the ninth gear being selectively restrained by the eighth gear.

2. The dual clutch transmission according to claim 1, wherein the second input shaft is formed in hollow to surround the first input shaft, and
    the first gear, the second gear, the third gear and the fourth gear are mounted sequentially in an axial direction of the second input shaft.

3. The dual clutch transmission according to claim 2, further including:
    a first synchronizer mounted between the first gear and the second gear and selectively connecting the first gear to the first input shaft; and a second synchronizer mounted between the first synchronizer and the second gear and selectively connecting the second gear to the first input shaft.

4. The dual clutch transmission according to claim 3, wherein the first output shaft is mounted with a third synchronizer selectively connecting the fifth gear to the first output shaft and a fourth synchronizer selectively connecting the sixth gear to the first output shaft, and wherein the fifth gear and the sixth gear are located between the third synchronizer and the fourth synchronizer.

5. The dual clutch transmission according to claim 4, further including a third output shaft mounted in parallel to the first input shaft and including a third output gear engaged with the ring gear of the differential, wherein a tenth gear is mounted on the first output shaft between the sixth gear and the fourth synchronizer, with a rotation of the tenth gear being continuously restrained by the sixth gear, and wherein an eleventh gear is mounted on the third output shaft to be engaged with the tenth gear, with a rotation of the eleventh gear being selectively restrained by the third output shaft.

6. The dual clutch transmission according to claim 5, wherein the third output shaft is mounted with a parking gear and a seventh synchronizer selectively connecting the eleventh gear to the third output shaft.

7. The dual clutch transmission according to claim 6, wherein the second output shaft is mounted with a fifth synchronizer selectively restraining the ninth gear to the second output shaft, and wherein a sixth synchronizer configured for selectively connecting the eighth gear and the ninth gear is mounted between the eighth gear and the ninth gear.

8. The dual clutch transmission according to claim 7, wherein the eighth gear is rotatably mounted on the second output shaft, and wherein the sixth synchronizer is mounted along an axial direction of the second output shaft between the eighth gear and the ninth gear.

9. The dual clutch transmission according to claim 8, wherein a total of six gear columns are provided, the six gear columns being spaces occupied in the axial direction by the first to eleventh gears and the first, second and third output gears engaged with each other in a direction perpendicular to the axial direction, and wherein a total of three sleeve columns are mounted in addition to the spaces occupied by the six gear columns in the axial direction, the three sleeve columns being spaces occupied by the first to seventh synchronizers in the axial direction, whereby all of transmission gear positions of six forward gear positions and a single reverse gear position are realizable.

10. The dual clutch transmission according to claim 9, wherein the six gear columns includes a first gear column including the first, second and third output gears, a second gear column including the fourth and ninth gears, a third gear column including the tenth and eleventh gears, a fourth gear column including the third and sixth gears, a fifth gear column including the second, fifth and eighth gears, and a sixth gear column including the first and seventh gears, and wherein the three sleeve columns includes a first sleeve column including the fourth, fifth and seventh synchronizers, a second sleeve column including the second and third synchronizers, and a third sleeve column including the first synchronizer.

11. The dual clutch transmission according to claim 10, the first gear column, the first sleeve column, the second gear column, the third gear column, the fourth gear, the fifth gear column, the second sleeve column, the third sleeve column, and the sixth gear column are aligned in series along the axial direction.

12. The dual clutch transmission according to claim 7, wherein the eighth gear is rotatably mounted on an external region of a portion connecting the ninth gear and the fifth synchronizer, and wherein the sixth synchronizer is mounted in the axial direction, between the eighth gear and the fifth synchronizer.

13. The dual clutch transmission according to claim 12, wherein a total of six gear columns are provided, the six gear columns being spaces occupied in the axial direction by the first to eleventh gears engaged with each other in a direction perpendicular to the axial direction, and wherein a total of two sleeve columns are mounted in addition to the spaces occupied by the six gear columns in the axial direction, the two sleeve columns being spaces occupied by a predetermined number of the first to seventh synchronizers in the axial direction, whereby all of transmission gear positions of six forward gear positions and a single reverse gear position are realizable.

14. The dual clutch transmission according to claim 13, wherein the six gear columns includes a first gear column including the first, second and third output gears, a second gear column including the fourth and ninth gears, a third gear column including the tenth and eleventh gears, a fourth gear column including the third and sixth gears, a fifth gear column including the second, fifth and eighth gears, and a sixth gear column including the first and seventh gears, and wherein the two sleeve columns includes a first sleeve column including the second, third and sixth synchronizers, and a second sleeve column including the first and fifth synchronizers.

15. The dual clutch transmission according to claim 14, the first gear column, the second gear column, the third gear column, the fourth gear, the fifth gear column, the first sleeve column, the second sleeve column, and the sixth gear column are aligned in series along an axial direction of the first input shaft.

16. The dual clutch transmission according to claim 1, wherein the second input shaft is formed in hollow to surround the first input shaft, and wherein the first, second, fourth, and third gears are mounted sequentially in an axial direction of the second input shaft.

17. The dual clutch transmission according to claim 12, wherein the first output shaft is mounted with the third synchronizer selectively connecting the fifth gear to the first output shaft and the fourth synchronizer selectively connecting the sixth gear to the first output shaft, wherein the fifth gear is located between the third synchronizer and the fourth synchronizer, and wherein the fourth synchronizer is located between the fifth gear and the sixth gear.

18. The dual clutch transmission according to claim 17, wherein the eighth gear is rotatably mounted on an external region of a portion connecting the ninth gear and the fifth synchronizer, and wherein the sixth synchronizer is mounted in the axial direction between the eighth gear and the fifth synchronizer.

\* \* \* \* \*